(12) United States Patent
Kuroyanagi et al.

(10) Patent No.: US 10,871,159 B2
(45) Date of Patent: Dec. 22, 2020

(54) VALVE DEVICE AND HIGH PRESSURE PUMP USING THE SAME

(71) Applicant: DENSO CORPORATION, Kariya (JP)

(72) Inventors: Masatoshi Kuroyanagi, Kariya (JP); Hiroshi Inoue, Kariya (JP); Shinichiro Koshimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 15/919,032

(22) Filed: Mar. 12, 2018

(65) Prior Publication Data
US 2018/0202435 A1    Jul. 19, 2018

Related U.S. Application Data

(62) Division of application No. 13/469,413, filed on May 11, 2012, now Pat. No. 9,951,770.

(30) Foreign Application Priority Data

| May 12, 2011 | (JP) | ................................ 2011-107357 |
| Aug. 25, 2011 | (JP) | ................................ 2011-183685 |
| Feb. 28, 2012 | (JP) | ................................ 2012-041394 |

(51) Int. Cl.
  *F04B 53/10* (2006.01)
  *F02M 59/02* (2006.01)
  (Continued)

(52) U.S. Cl.
  CPC ......... *F04B 53/1087* (2013.01); *F02M 59/02* (2013.01); *F02M 59/368* (2013.01);
  (Continued)

(58) Field of Classification Search
  CPC ...... F04B 53/1087; F04B 53/16; F04B 53/14; F04B 53/1032; F04B 53/103; F04B 19/22;
  (Continued)

(56) References Cited

U.S. PATENT DOCUMENTS

| 2,569,027 A | 9/1951 | Stoner |
| 2,686,534 A | 8/1954 | Montelius |
| (Continued) | | |

FOREIGN PATENT DOCUMENTS

| JP | 2004-218633 | 8/2004 |
| JP | 2010-156264 | 7/2010 |

*Primary Examiner* — Jessica Cahill
*Assistant Examiner* — Patrick C Williams
(74) *Attorney, Agent, or Firm* — Nixon & Vanderhye, P.C.

(57) ABSTRACT

A valve seat has an inner passage and outer passages. A suction valve member has first passages and a first projection portion that guides, to the first passages, the fuel that flows from a pressure chamber at the time of valve opening. Therefore, an action force by the dynamic pressure applied to the suction valve member in the valve closing direction is reduced. An action force by the pressure of fuel that flows into pressure equalization grooves counterbalances the action force by the dynamic pressure of the suction valve member. Therefore, self-closing by the dynamic pressure can be inhibited, and the maximum output of an electromagnetic driving unit can be reduced. Fuel flows through a passage radially outside the suction valve member and the first passages. A fluid passage area is securable even when a lift amount of the suction valve member is small.

22 Claims, 30 Drawing Sheets

(51) Int. Cl.

| | |
|---|---|
| *F02M 59/46* | (2006.01) |
| *F04B 19/22* | (2006.01) |
| *F16K 1/32* | (2006.01) |
| *F16K 1/50* | (2006.01) |
| *F16K 1/54* | (2006.01) |
| *F16K 31/06* | (2006.01) |
| *F04B 53/14* | (2006.01) |
| *F04B 53/16* | (2006.01) |
| *F16K 1/16* | (2006.01) |
| *F16K 31/44* | (2006.01) |
| *F02B 63/00* | (2006.01) |
| *F02M 59/36* | (2006.01) |
| *F04B 7/00* | (2006.01) |
| *F02M 63/00* | (2006.01) |
| *F16K 1/42* | (2006.01) |

(52) U.S. Cl.
CPC .......... *F02M 59/46* (2013.01); *F02M 59/466* (2013.01); *F02M 63/0035* (2013.01); *F02M 63/0075* (2013.01); *F02M 63/0077* (2013.01); *F02M 63/0078* (2013.01); *F04B 19/22* (2013.01); *F04B 53/14* (2013.01); *F04B 53/16* (2013.01); *F16K 1/32* (2013.01); *F16K 1/42* (2013.01); *F16K 1/50* (2013.01); *F16K 1/54* (2013.01); *F16K 31/0655* (2013.01); *F16K 31/44* (2013.01); *F04B 7/0076* (2013.01); *F04B 53/103* (2013.01); *F04B 53/1032* (2013.01)

(58) Field of Classification Search
CPC ........ F16K 31/0655; F16K 31/44; F16K 1/54; F16K 1/50; F16K 1/32; F16K 1/42; F02M 59/46; F02M 59/02; F02M 63/0035; F02M 63/0075; F02M 63/0078; F02M 63/0077; F02M 59/368
See application file for complete search history.

(56) References Cited

U.S. PATENT DOCUMENTS

| | | | |
|---|---|---|---|
| 2,949,928 A | 8/1960 | Hobson | |
| 5,483,992 A * | 1/1996 | Lehmann | F04B 39/1033 137/516.21 |
| 6,230,991 B1 | 5/2001 | Steinruck et al. | |
| 6,510,868 B2 * | 1/2003 | Penza | F04B 39/1033 137/516.13 |
| 6,539,974 B2 * | 4/2003 | Steinruck | F04B 39/1033 137/512.1 |
| 6,619,615 B1 | 9/2003 | Mayr et al. | |
| 7,124,998 B2 * | 10/2006 | Steinruck | F16K 1/42 251/129.21 |
| 7,370,816 B2 | 5/2008 | Kumagai et al. | |
| 2007/0057096 A1 | 3/2007 | Steinruck et al. | |
| 2010/0166584 A1 | 7/2010 | Fukui et al. | |
| 2010/0242922 A1 | 9/2010 | Mancini et al. | |
| 2010/0243076 A1 | 9/2010 | Hayashi | |

* cited by examiner

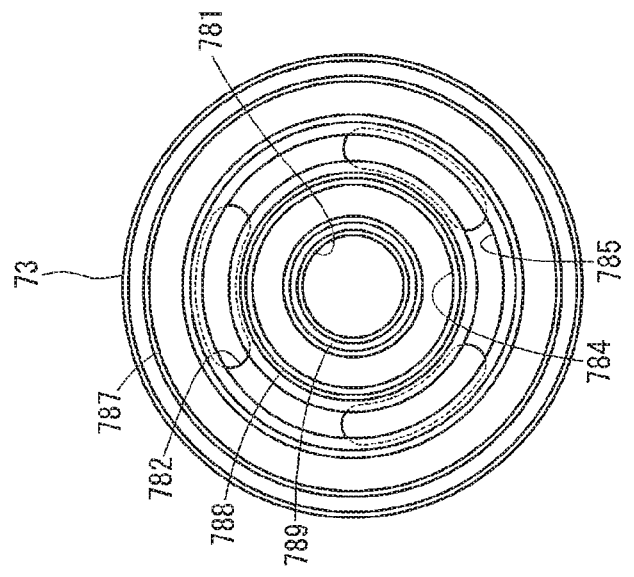
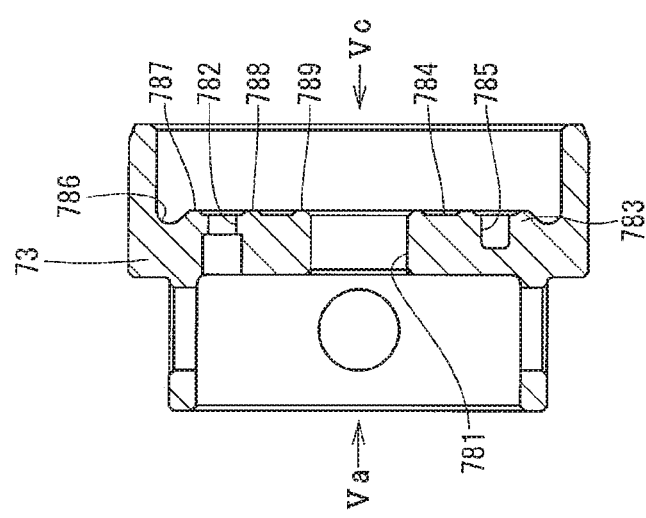
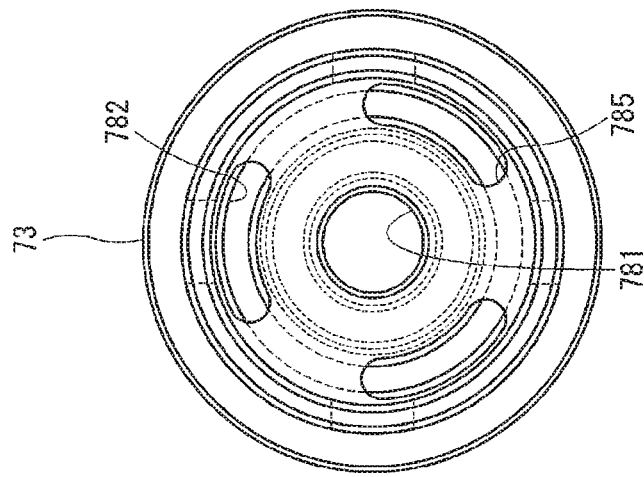

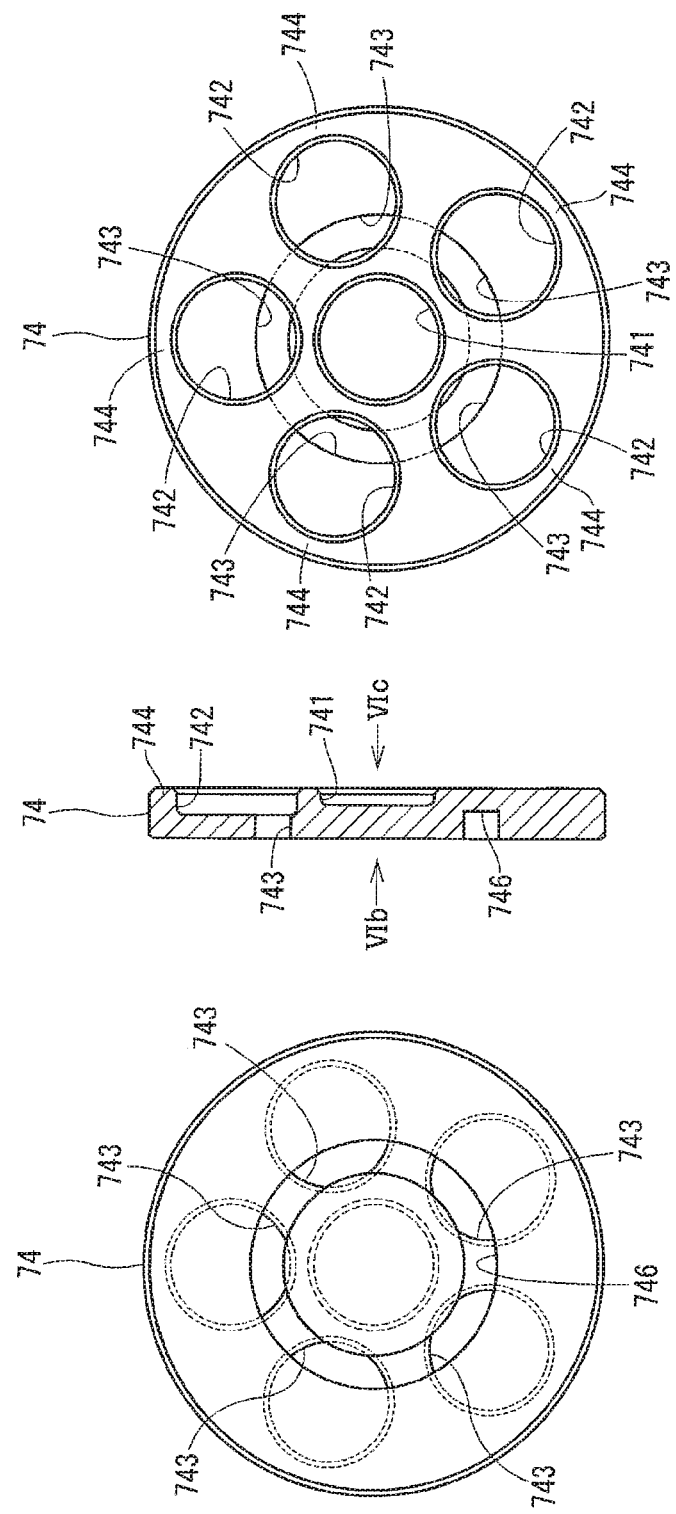

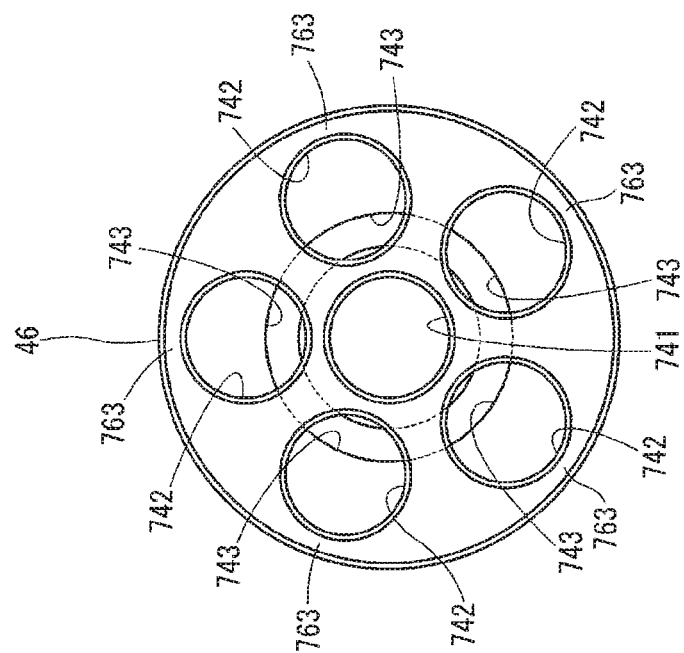
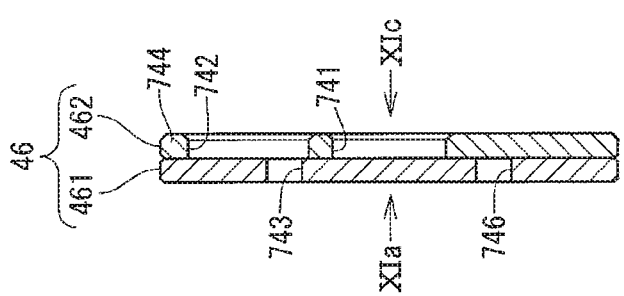
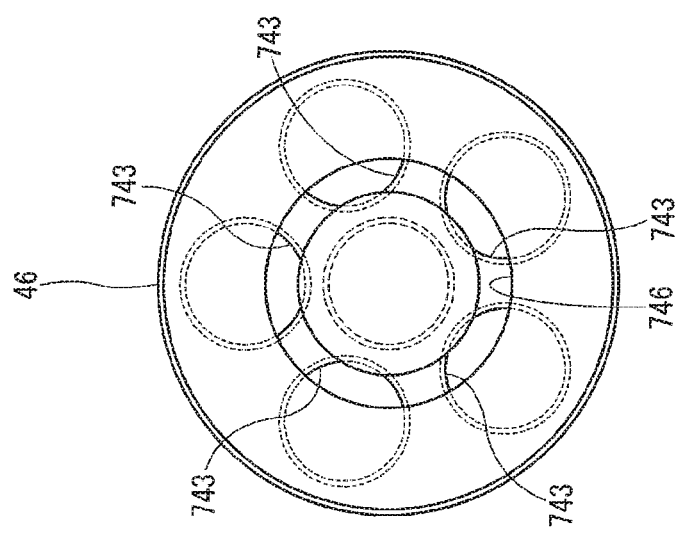

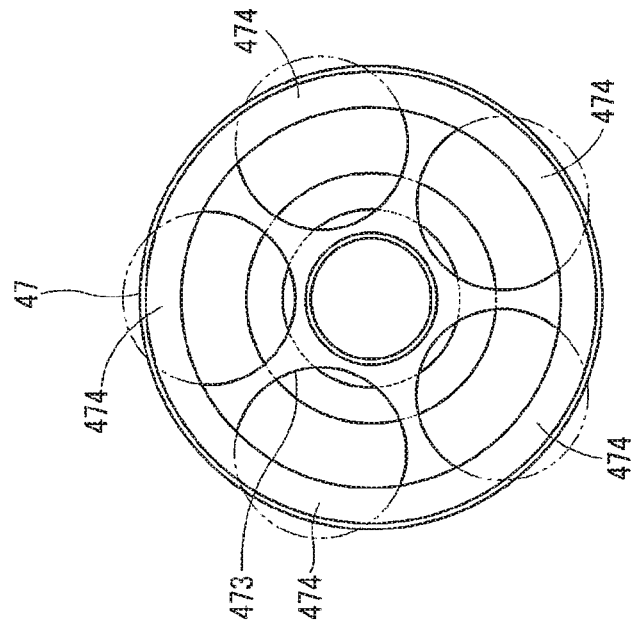
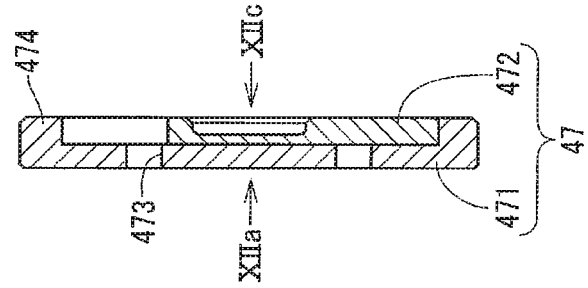
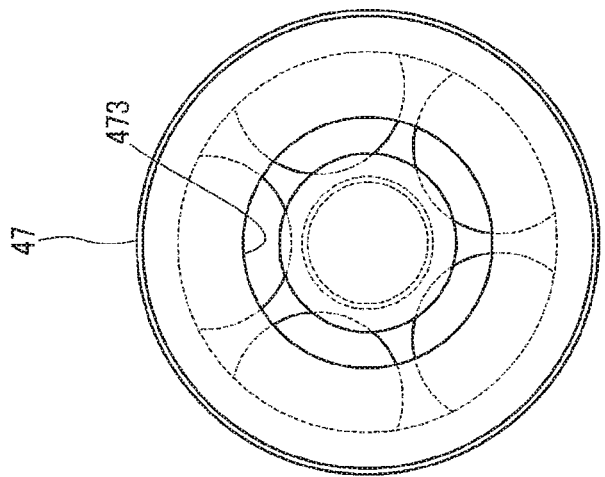

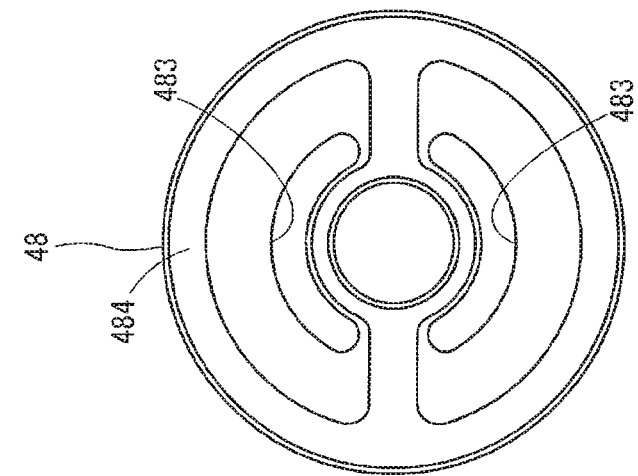
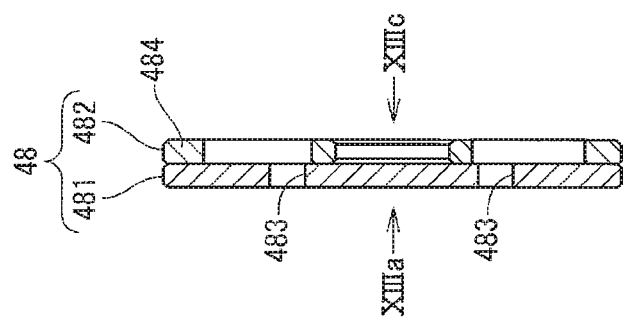
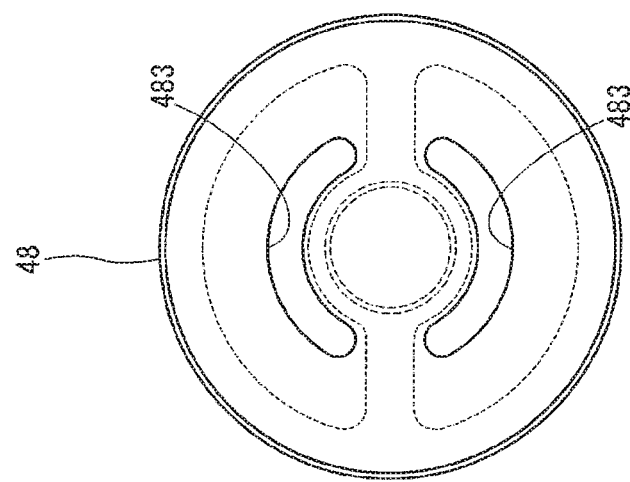

FIG. 27A
FIG. 27B
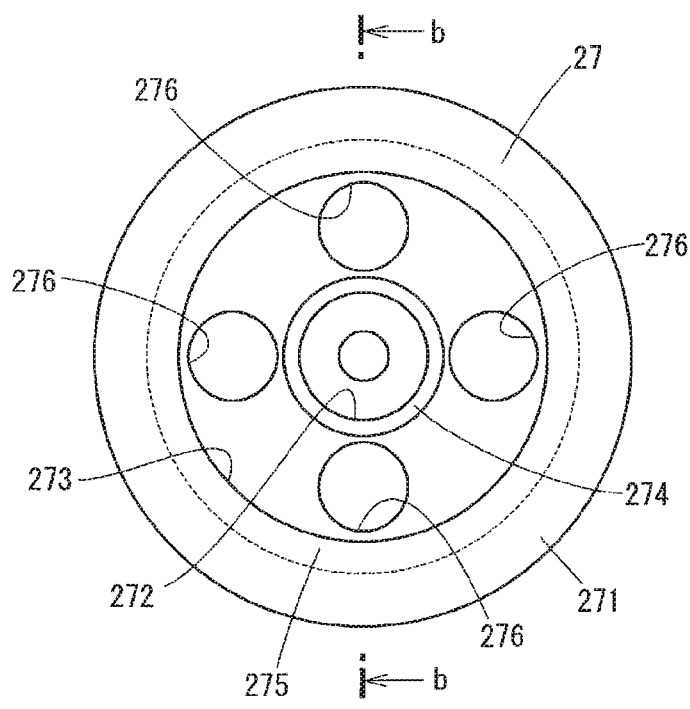
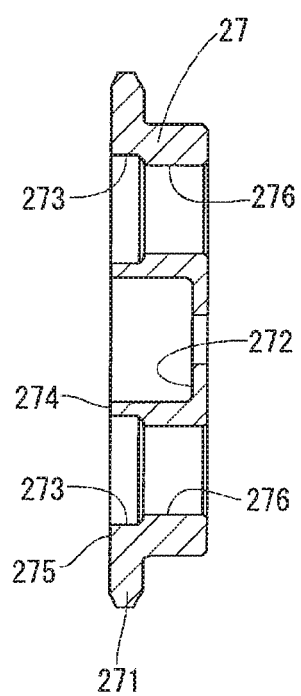

VALVE DEVICE AND HIGH PRESSURE PUMP USING THE SAME

CROSS-REFERENCE TO RELATED APPLICATIONS

This application is a divisional of U.S. application Ser. No. 13/469,413, filed May 11, 2012, which is based on Japanese Patent Applications No. 2011-107357 filed on May 12, 2011, No. 2011-183685 filed on Aug. 25, 2011 and No. 2012-41394 filed on Feb. 28, 2012, the disclosures of which are incorporated herein by reference.

TECHNICAL FIELD

The present invention relates to a valve device that can open and close passages and to a high pressure pump using this valve device.

BACKGROUND

Valve devices are used to block a passage where fluid flows. Such valve devices include a valve member that is movable toward and away from a valve seat in a valve body. In this type of valve devices, the valve member abuts against the valve seat for valve closing, and the valve member separates from the valve seat for valve opening. A position of the valve member is controlled by a movable member of a driving unit. For example, the valve member is electromagnetically driven.

The valve devices include a normally-open type valve in which a valve is opened when a driving unit does not operate and a normally-close type valve in which a valve is closed when a driving unit does not operate. In the normally-open type, when a driving unit is not operating, a valve member is biased in a valve opening direction by a biasing member to move away from a valve seat. A movable member moves in the valve closing direction against the biasing force of the biasing member to permit the valve member to move toward the valve seat when the driving unit is operating.

In the normally-close type, when a driving unit is not operating, a valve member is biased by a biasing member in the valve closing direction to abut against a valve seat. When the driving unit is operating, a movable member moves in the valve opening direction against the biasing force of the biasing member to permit the valve member to move oppositely to the valve seat.

The above valve device is disclosed in Patent Documents 1 to 7, for example. A fuel suction valve of a high pressure pump disclosed in Patent Documents 1 and 2 is a normally-open type valve provided with an electromagnetic driving unit. When a valve member moves apart from a valve seat, a fuel flows through a passage between a radially outer wall surface of the valve member and an inner wall surface of a valve body. The valve member shown in Patent Document 1 receives a fuel flow from a pressurization chamber at a time of metering stroke of the high pressure pump. At this time, a dynamic pressure on the valve member becomes large especially at high speed operation of the high pressure pump. Meanwhile, in a fuel suction valve shown in Patent Documents 2, a stopper that inhibits movement of a valve member in the valve opening direction is provided at a pressurization chamber to prevent fuel flowing from the pressurization chamber from directly hitting the valve member.

A fuel suction valve of the high pressure pump disclosed in Patent Document 3 is a normally-close type valve provided with an electromagnetic driving unit. The fuel suction valve includes a movable member at its axial center. An elastic plate member is shifted by the movable member to ensure a passage from a pressurization chamber to a fuel gallery. Gas valves disclosed in Patent Documents 4 to 6 are a normally-open type valve and a normally-close type valve provided with an electromagnetic driving unit.

Flow control valves disclosed in Patent Document 7 are a normally-close type valve device and a normally-open type valve device provided with a driving unit formed of a piezo actuator. In the valve devices shown in Patent Documents 3 to 7, fluid flows through the multiple first passages of the valve member at the time of valve opening. At this time, a dynamic pressure in a valve opening direction generated by a flow of fluid is applied to portions other than the first passages of the valve member.

[Patent documents 1] JP-2004-218633A
[Patent documents 2] JP-2010-156264A
[Patent Document 3] US-2010-0242922A1
[Patent Document 4] US-2007-0057096A1
[Patent Document 5] US-7124998B2
[Patent documents 6] JP-11-311150A
[Patent documents 7] JP-2010-230159A The valve member show in Patent Document 1 is not structured to avoid the dynamic pressure generated by a flow of fuel from the pressurization chamber. Therefore, to prevent a self-closing in which the valve member is closed by the dynamic pressure, a large biasing force of the biasing member may be required to bias the valve member in the valve opening direction. Accordingly, an attraction force of an electromagnet of the driving unit increases to move the movable member against the biasing force of the biasing member. This causes a disadvantage that the driving unit has a large size.

If a lift amount of the valve member from the valve seat is too small, a required fluid passage area is not securable. Therefore, it may be difficult to make the lift amount small. The electromagnet of the driving unit may need to generate an attraction force to attract the movable member, which is more than the lift amount. This also causes enlargement of the driving unit.

In the fuel suction valve shown in Patent Document 2, a wringing generated between the valve member and the stopper may deteriorate a valve closing responsiveness. The wringing force on the valve member can be reduced by forming a communicating hole in a stopper. However, when the communicating hole is too large, fuel flows into the stopper through the communicating hole. This fuel flow is applied to the valve member in the valve closing direction. Therefore, it is difficult to inhibit self-closing of the valve member sufficiently. Since a tuning of the inner diameter of the communicating hole depends on a kinetic viscosity of fuel and a flow velocity of fuel, the tuning may need to be changed in response to a cam specification and a highest pump rotation speed required by a user.

In the valve devices of Patent Documents 3 to 7, the multiple first passages are formed to the valve member to make the passage area large. As a result, the lift amount of the valve member from the valve seat can be made small. However, the driving unit is enlarged to prevent self-closing of the valve member.

SUMMARY

It is an object of the present disclosure to provide a valve device in which a driving unit can be made smaller and a high pressure pump using the same.

A valve device of the present disclosure is provided with a valve body, a valve seat, a valve member, and a driving unit. The valve seat has an inner passage located inward in the radial direction of the valve body and outer passages located outward in the radial direction of the valve body. The valve member can abut against and move away from the valve seat and has first passages located between the inner passage and the outer passages in the radial direction.

A fluid flows through a passage passing through a radially outside passage radially outside the valve member to the outer passages of the valve seat, a passage passing through the first passages of the valve member to the outer passages of the valve seat, and a passage passing through the first passages of the valve member to the inner passage of the valve seat.

Therefore, in comparison with a structure in which fluid flows through only a radially outside passage, the valve device may ensure the same passage area as the structure even when a lift amount of the valve member from the valve seat is made small. Therefore, the lift amount can be made small and the maximum output of the driving unit can be reduced. As a result, the downsizing of the driving unit is realized. Further, an advantageous effect is obtainable in which, due to the small lift amount, the impact noise of the valve member and the movable member is small.

The valve member forms a first annular seal portion, a second annular seal portion, and a third annular seal portion. The first seal portion seals between the inner passage and the first passages when the valve member abuts against the valve seat. The second seal portion seals between the first passages and outer passages when the valve member abuts against the valve seat. The third seal portion seals between the outer passages and the radially outside passage when the valve member abuts against the valve seat.

The force by pressure of the fluid which flows between the valve seat and the valve member is applied to each of seal portions to open the valve member. The force in the valve opening direction applied to each of the above-mentioned seal portions is applied equally to the valve member in the circumferential direction, and can counterbalance the force in the valve closing direction that is received by the valve member from the flow of fluid from the opposite side to the valve seat relative to the valve member.

Therefore, for example, in a normally-open type valve, even when the biasing force of a biasing member to bias the valve member in the valve opening direction is made small, a self-closing of the valve member can be inhibited. Therefore, the biasing force of the biasing member can be made small, and the maximum output of the driving unit to move the movable member against the biasing force of the biasing member can be reduced. As a result, further downsizing of the driving unit is realized.

In a normally-close type valve device, even when the maximum output of a driving unit that presses a valve member in the valve opening direction, a self-closing of the valve member can be inhibited. Therefore, the maximum output of the driving unit can be reduced and further downsizing of the driving unit is realized.

A guide portion inhibits the flow of fluid from the opposite side to the valve seat relative to the valve member from flowing toward the radially outside passage. By inhibiting the flow toward the radially outside passage, the dynamic pressure on the peripheral portion of the valve member can be reduced. The guide portion guides fluid to the first passages. That is, application of the dynamic pressure on portions other than the first passages of the valve member can be inhibited. The fluid guided to the first passages is supplied between the valve seat and the valve member, and produces a force applied to the valve member in the valve opening direction as mentioned above. Therefore, the guide portion can reduce the maximum output of the driving unit, and contributes to further downsizing of the driving unit.

As mentioned above, by reducing the maximum output of the driving unit, an advantageous effect is obtainable in which applied current of the driving unit becomes small. As a result, expensive elements are unnecessary for a driving circuit that drives the driving unit, so that cost reduction of the driving unit can be achieved.

BRIEF DESCRIPTION OF THE DRAWINGS

The above and other objects, features and advantages of the present disclosure will become more apparent from the following detailed description made with reference to the accompanying drawings. In the drawings:

FIG. 5A is a view showing a second suction valve body viewed from a "Va" of a longitudinal sectional view of the second suction valve body;

FIG. 5B is a longitudinal sectional view of the second suction valve body;

FIG. 5C is a view showing the second suction valve body viewed from an arrow "Vc" of the longitudinal sectional view;

FIG. 6A is a view showing the suction valve member viewed from an arrow "VIb" of a longitudinal sectional view of the suction valve member;

FIG. 6B is a longitudinal sectional view of the suction valve member;

FIG. 6C is a view showing the suction valve member viewed from an arrow "VIc" of the longitudinal sectional view;

FIG. 11A is a view showing a suction valve member viewed from an arrow "XIa" of a longitudinal sectional view of the suction valve member according to a fourth embodiment;

FIG. 11B is a longitudinal sectional view of the suction valve member;

FIG. 11C is a view showing the suction valve member viewed from an arrow "XIc" of the longitudinal sectional view;

FIG. 12A is a view showing a suction valve member viewed from an arrow "XIIa" of a longitudinal sectional view of the suction valve member according to a fifth embodiment;

FIG. 12B is a longitudinal sectional view of the suction valve member;

FIG. 12C is a view showing the suction valve member viewed from an arrow "XIIc" of the longitudinal sectional view;

FIG. 13A is a view showing a suction valve member viewed from an arrow "XIIIa" of a longitudinal sectional view of the suction valve member according to a sixth embodiment;

FIG. 13B is the longitudinal sectional view of the suction valve member;

FIG. 13C is a view showing the suction valve member viewed from an arrow "XIIIc" of the longitudinal sectional view;

FIG. 27A is a plan view of the suction valve member;

FIG. 27B is a sectional view of the suction valve member;

DETAILED DESCRIPTION

Hereafter, multiple embodiments of the present invention are described in reference to the drawings. Substantially the same components among the embodiments are indicated by the same numerals, and their descriptions are not repeated.

First Embodiment

Figure 1:
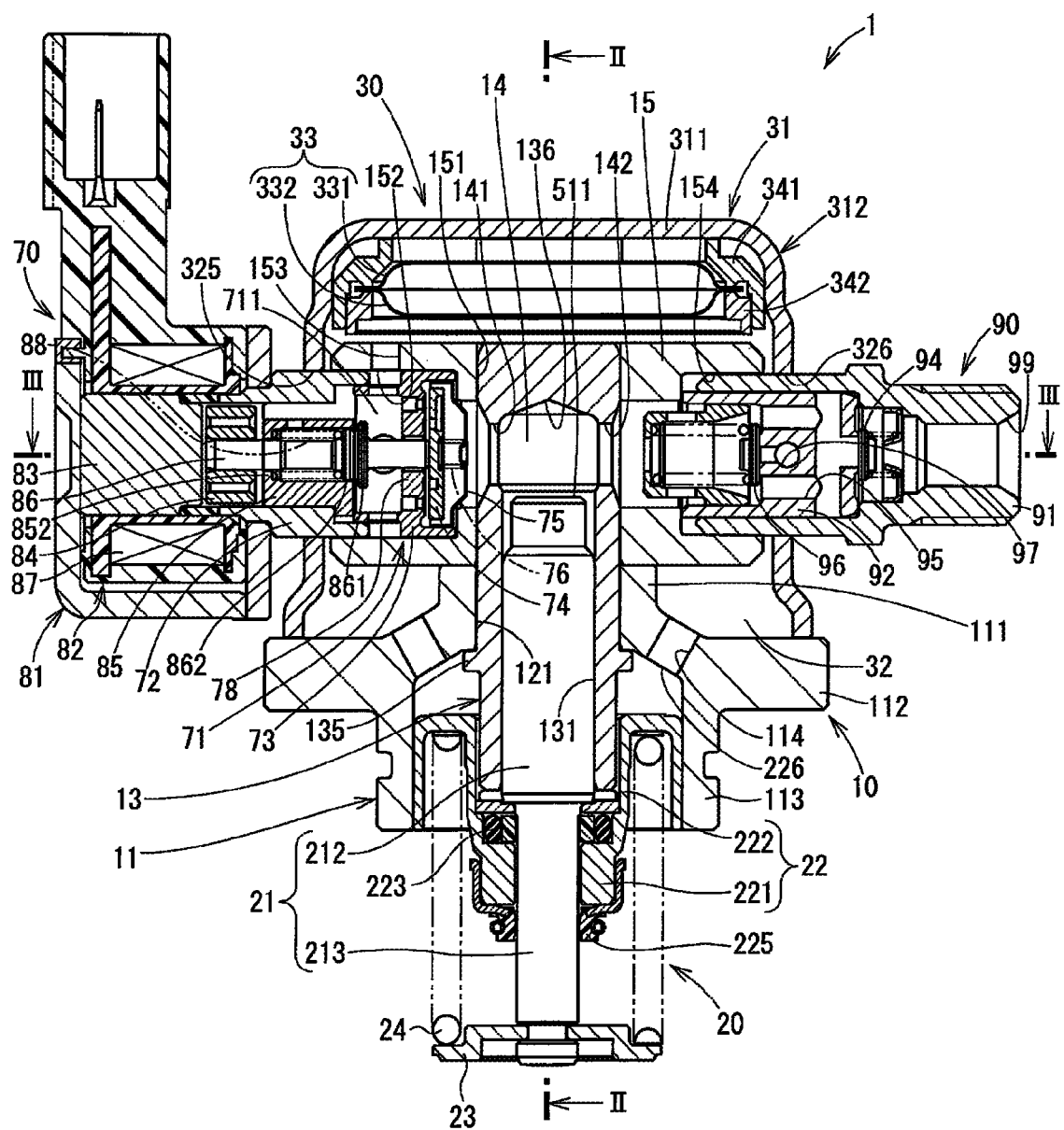
FIG. 1 is a sectional view of a high pressure pump according to a first embodiment of the present invention.
Figure 2:
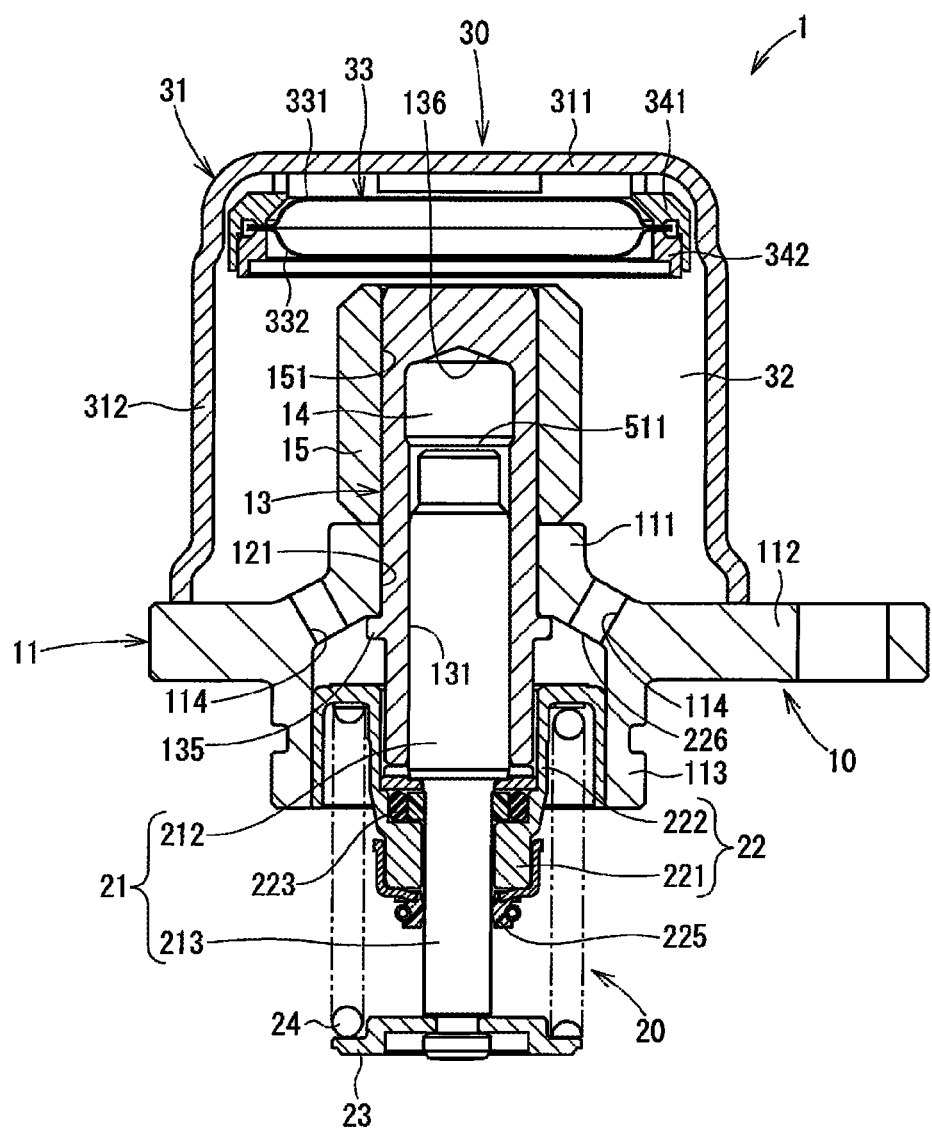
FIG. 2 is a sectional view taken along a line II-II of FIG. 1.
Figure 3:
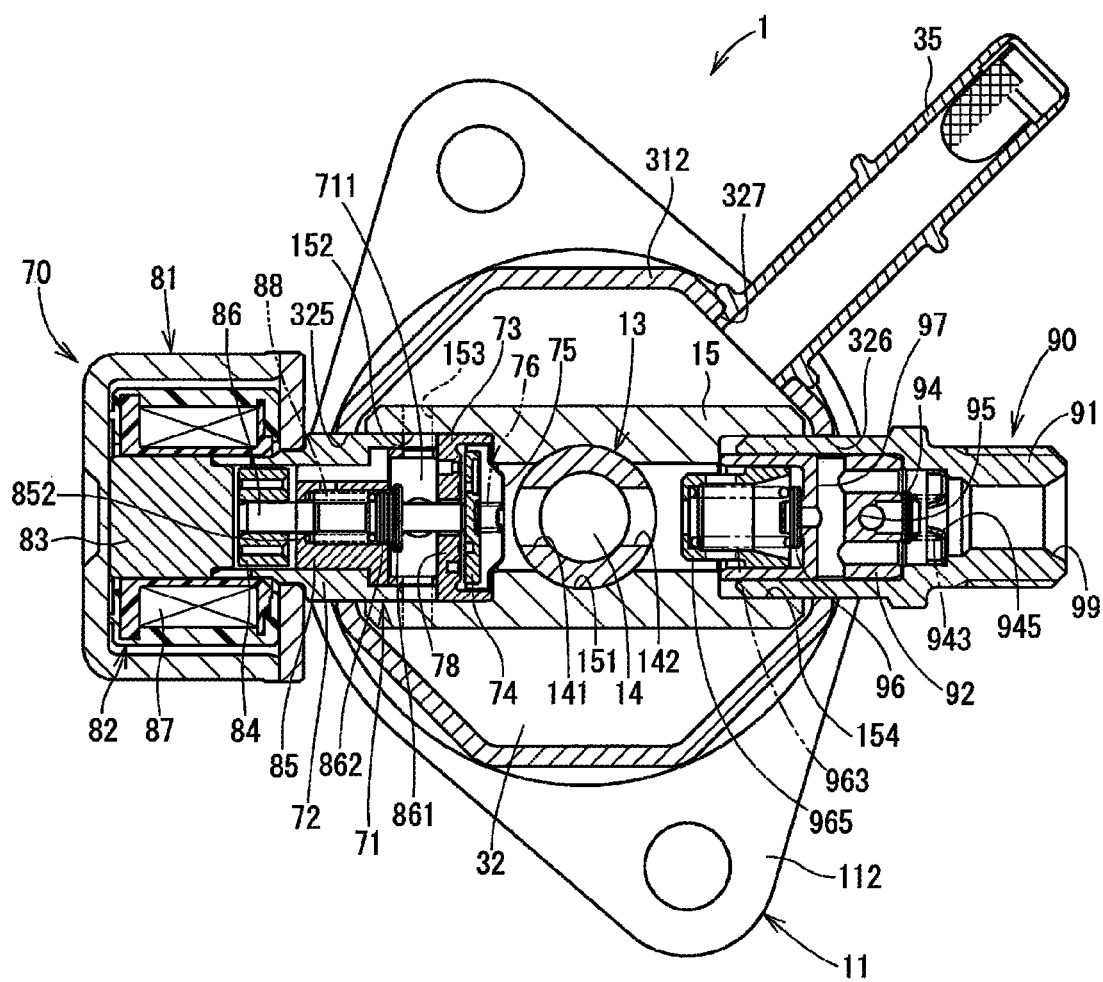
FIG. 3 is a sectional view taken along a line III-III of FIG. 1.
Figure 4:
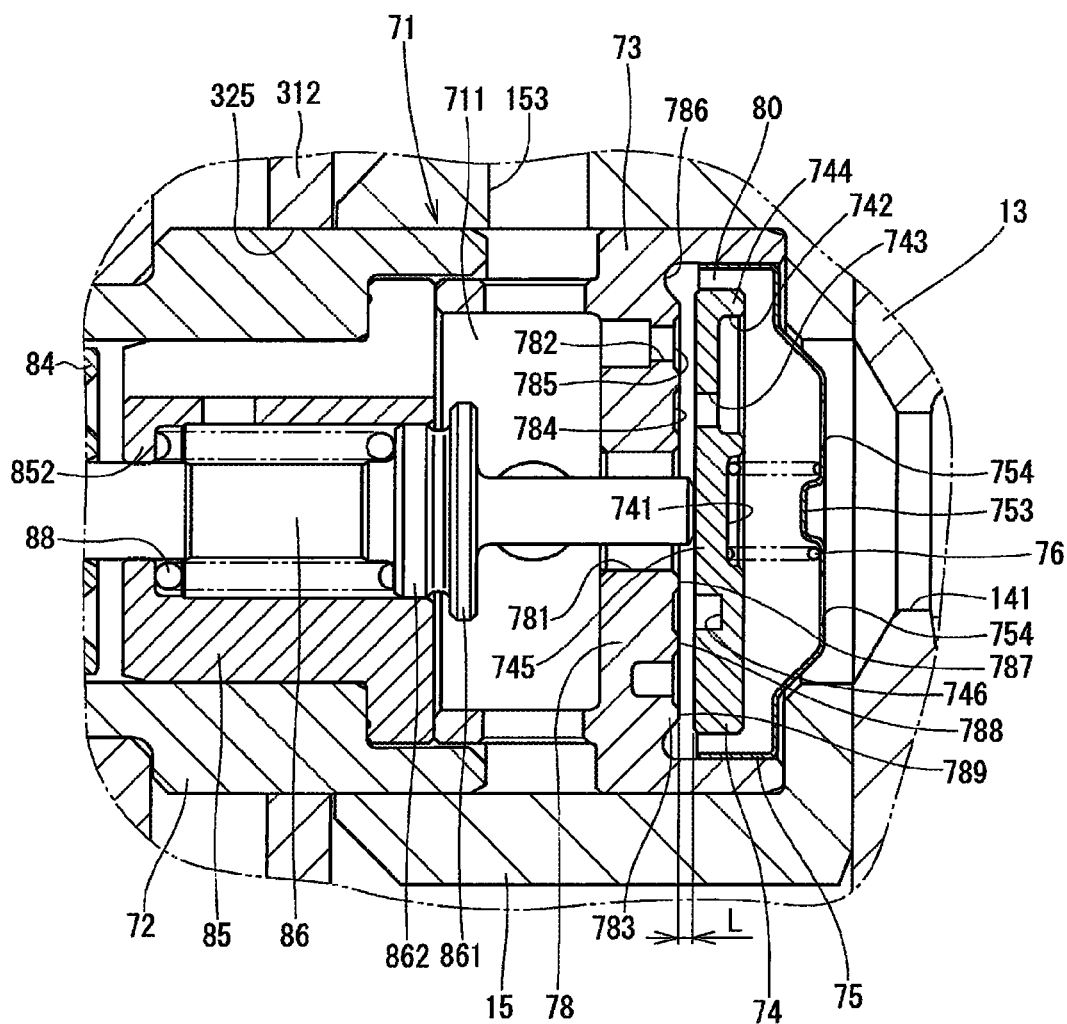
FIG. 4 is an enlarged sectional view of a suction valve portion of the high pressure pump when the suction valve portion is opened.
Figure 7:
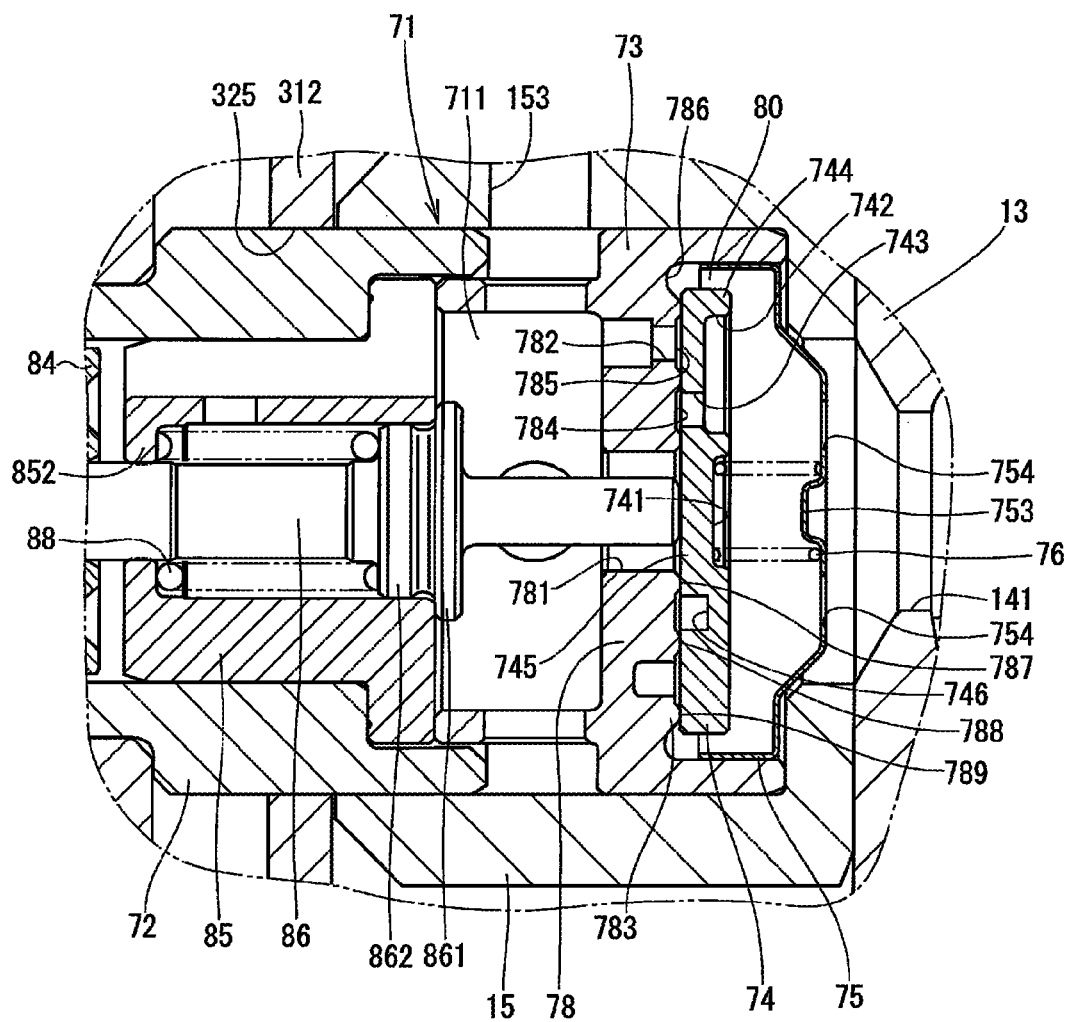
FIG. 7 is an enlarged sectional view of an enlarged suction valve portion of the high pressure pump when the suction valve portion is closed.

A high pressure pump of a first embodiment of the present invention is shown in FIGS. 1 to 3. A high pressure pump 1 is a fuel pump that pressurizes fuel supplied from a fuel tank, not shown, and discharges this pressurized fuel to a fuel rail. The high pressure pump 1 is provided with a body portion 10, a fuel supply portion 30, a plunger portion 20, a fuel suction portion 70, and a fuel discharge relief portion 90. The fuel suction portion 70 corresponds to "valve device" In the following description, the upper side of FIG. 1 will be taken as "up", "upward" or "upper," and the low side of the FIG. 1 will be taken as "down", "downward" or "lower."

The body portion 10 includes a lower housing 11, a cylinder 13, and an upper housing 15. The lower housing 11 has a cylindrically-shaped cylinder retaining portion 111, an annular flange portion 112 projecting radially outward from the lower portion of the cylinder retaining portion 111, and a cylindrically-shaped engine fitting portion 113 projecting downward from the flange portion 112. An inner diameter of the engine fitting portion 113 is larger than an outer diameter of the cylinder retaining portion 111. The cylinder retaining portion 111 has a first press-fit hole 121. The flange portion 112 has a through hole 114 between the cylinder retaining portion 111 and engine fitting portion 113.

The cylinder 13 has a cylindrical portion 131 that slidably supports a plunger 21, a bottom portion 136 that covers the upper end of the cylindrical portion 131, and an annular projection 135 that projects radially outward below the cylinder retaining portion 111. The cylinder 13 is secured to the first press-fit hole 121 of the cylinder retaining portion 111 by press fit. The projection 135 restricts upward movement of the cylinder 13.

The cylinder 13 has a pressurization chamber 14 defined by the inner wall of the cylindrical portion 131, the inner wall of the bottom portion 136, and an upper end face 211 of the plunger 21. A volumetric capacity of the pressurization chamber 14 changes by reciprocation of the plunger 21. The cylindrical portion 131 has an inlet port 141 and an outlet port 142 that communicate with the pressurization chamber 14. The inlet port 141 and outlet port 142 are symmetrically located relative to the axis of the plunger 21.

The upper housing 15 has a rectangular shape that is longitudinal in the direction between the inlet port 141 and outlet port 142. The upper housing 15 has a second press-fit hole 151 in its longitudinal center. The cylinder 13 is secured to the second press-fit hole 151 of the upper housing 15 by press fit.

The upper housing 15 has a suction passage 152 communicating with the inlet port 141 of the cylinder 13 and multiple through-holes 153 penetrating the upper housing 15. The fuel introduced into the pressurization chamber 14 can pass through the suction passage 152. The upper housing 15 has a discharge passage 154 communicating with the outlet port 142 of the cylinder 13. The fuel discharged from the pressurization chamber 14 can pass through the discharge passage 154.

The fuel supply portion 30 includes a cover 31, a pulsation damper 33, and a fuel inlet 35. The cover 31 has a bottomed cylindrical shape, and has a cover bottom portion 311 and a cover cylindrical portion 312. The cover bottom portion 311 covers the upper end of the cover cylindrical portion 312. The lower end of the cover cylindrical portion 312 is in contact with the flange portion 112 of the lower housing 11. The cover 31 houses the upper portions of the upper housing 15 and cylinder 13.

The cover cylindrical portion 312 has a first fitting hole 325, a second fitting hole 326, and a third fitting hole 327 that are separated from each other circumferentially. A position of the first fitting hole 325 corresponds to the suction passage 152, and a position of the second fitting hole 326 corresponds to the discharge passage 154. A first suction valve body 72 is inserted in the first fitting hole 325 from outside the cover 31. A first discharge valve body 91 is inserted in the second fitting hole 326 from outside the cover 31.

The cover 31 is joined with the flange portion 112 by welding. The first suction valve body 72, first discharge valve body 91, and fuel inlet 35 are joined with the cover 31 by welding. A clearance between the lower end of the cover 31 and the flange portion 112, a clearance between the first fitting hole 325 and the first suction valve body 72, a clearance between the second fitting hole 326 and the first discharge valve body 91, and a clearance between the third fitting hole 327 and the fuel inlet 35 are sealed fluid-tightly.

In the cover 31, a fuel gallery 32 defined by the cover 31 and flange portion 112 is formed. Fuel supplied from the fuel inlet 35 to the fuel gallery 32 is supplied into the first suction valve body 72 via the through-hole 153 and the like.

The pulsation damper 33 is formed in the fuel gallery 32. The pulsation damper 33 includes two circular dished diaphragms 331 and 332 of which outer edges are joined to seal a gas of a predetermined pressure therein. The pulsation damper 33 has an outer edge sandwiched between an upper support body 341 and a lower support body 342 to be secured to the inner wall of the cover 31. The pulsation damper 33 elastically deforms in response to a pressure change of fuel in the fuel gallery 32 to reduce pressure pulsations of fuel in the fuel gallery 32.

The plunger portion 20 includes the plunger 21, an oil seal holder 22, a spring seat 23, and a plunger spring 24. The plunger 21 has a large diameter portion 212 and a small diameter portion 213. The large diameter portion 212 is supported by the cylinder 13 slidably in the axial direction. The small diameter portion 213 extends downward from the large diameter portion 212, and has a lower end that can abut against, e.g., a tappet, not shown. The tappet makes its outer surface abut against a cam attached to a cam shaft, not shown, and reciprocates axially by rotation of the cam shaft in response to a cam profile.

The oil seal holder 22 has a secured portion 222 secured to the engine fitting portion 113 of the lower housing 11 and a cylindrical seal retaining portion 221 located below the cylinder 13 to insert the small diameter portion 213 of the plunger 21. The seal retaining portion 221 holds a seal 223. The seal 223 includes a Teflon (registered trademark) ring on its radial inside and an O ring on its radial outside to adjust a thickness of a fuel oil film around the small diameter portion 213. An oil seal 225 is secured to the lower end of the seal retaining portion 221. The oil seal 225 adjusts a thickness of an oil film around the small diameter portion 213.

The spring seat 23 is secured to the lower end of the plunger 21. One end of the plunger spring 24 is engaged with the spring seat 23 and the other end is engaged with the secured portion 222 of the oil seal holder 22. The plunger spring 24 functions as a return spring of the plunger 21 to bias the plunger 21. Accordingly, the plunger 21 abuts against the tappet. The plunger portion 20 reciprocates the plunger 21 in response to a rotation of the cam shaft to change a volumetric capacity of the pressurization chamber 14.

The fuel discharge relief portion 90 includes a first discharge valve body 91, a second discharge valve body 92, a discharge valve member 94, and a relief valve member 96. The first discharge valve body 91 is cylindrical and secured to the discharge passage 154 of the upper housing 15. The second discharge valve body 92 is provided in the first discharge valve body 91. The second discharge valve body 92 has a bottomed cylindrical shape, and sandwiched between the first discharge valve body 91 and upper housing 15 when an opening end of the second discharge valve body 92 is located on the side of the pressurization chamber 14.

The bottom portion of the second discharge valve body 92 has a discharge passage 95 and a relief passage 97 not communicating with the discharge passage 95. The discharge passage 95 opens radially outward at a wall surface of the bottom portion of the second discharge valve body 92 from the side of the pressurization chamber 14, and opens at the center of a wall surface of the bottom portion of the second discharge valve body 92 oppositely to the pressurization chamber 14. The relief passage 97 opens at the center of the wall surface of the bottom portion of the second discharge valve body 92 and opens radially outward at the wall surface of the bottom portion of the second discharge valve body 92 oppositely to the pressurization chamber 14.

The discharge valve member 94 is located oppositely to the pressurization chamber 14 relative to the bottom portion of the second discharge valve body 92 to be able to open and close the discharge passage 95. The discharge valve member 94 is biased in the valve closing direction by a discharge valve spring 943 held by a discharge valve spring holder 945.

The relief valve member 96 is located on the side of the pressurization chamber 14 relative to the bottom portion of the second discharge valve body 92 to be able to open and close the relief passage 97. The relief valve member 96 is biased in the valve closing direction by a relief valve spring 963 held by a relief valve spring holder 965.

The fuel suction portion 70 is a normally open type one and includes a suction valve portion 71 and an electromagnetic driving unit 81. The fuel suction portion 70 corresponds to "valve device". The electromagnetic driving unit 81 corresponds to "driving unit". The suction valve portion 71 has a first suction valve body 72, a second suction valve body 73, a suction valve member 74, and a spring guide 75.

The first suction valve body 72 is cylindrical, and secured to the inner wall of the suction passage 152. The first suction valve body 72 has a suction chamber 711 therein. The second suction valve body 73 is provided to the suction chamber 711. The second suction valve body 73 is cylindrical, and has a valve seat 78 defining the interior space of the suction chamber 711. The second suction valve body 73 corresponds to "valve body"

The suction valve member 74 is disk shaped, located on the side of the pressurization chamber 14 relative to the valve seat 78, and can abut against and move away from the valve seat 78. The suction valve member 74 moves away from the valve seat 78 to communicate the suction chamber 711 with the pressurization chamber 14. The suction valve member 74 abuts the valve seat 78 to block the suction chamber 711 from the pressurization chamber 14. The suction valve member 74 corresponds to "valve member"

The spring guide 75 has a bottomed cylindrical shape, and is provided on the side of the pressurization chamber 14 relative to the second suction valve body 73. The spring guide 75 corresponds to "cover member". A first spring 76 is provided between the spring guide 75 and the suction valve member 74. The first spring 76 biases the suction valve member 74 in the valve closing direction.

The electromagnetic driving unit 81 has a movable core 84, a needle 86, a needle guide 85, and an electromagnet 82. The movable core 84 is cylindrical and provided to be axially movable within the first suction valve body 72. The movable core 84 is secured to one end of the needle 86. The needle 86 is supported by the needle guide 85 to be axially movable within the first suction valve body 72. The needle 86 is movable together with the movable core 84, and the other end can abut against the suction valve member 74. The movable core 84 and needle 86 are movable members of the electromagnetic driving unit 81.

The needle 86 forms an annular stopper portion 861 projecting radially outward on the side of the valve seat 78 relative to the needle guide 85. The needle 86 is movable toward the secured core 83 until the stopper portion 861 abuts the needle guide 85. One end of the needle guide 85 on the side of the movable core 84 forms a first collar 852 that projects radially inward. The needle 86 forms a second collar 862 that projects radially outward at a position corresponding to the other end of the needle guide 85.

A second spring 88 is provided between the first collar 852 and the second collar 862. The second spring 88 biases the needle 86 in the valve opening direction by a stronger force than that of the first spring 76 that biases the suction valve member 74 in the valve closing direction (rightward in FIG. 1). The needle 86 receives the biasing force from the second spring 88, and presses the suction valve member 74 in the valve opening direction.

The electromagnet 82 has the secured core 83, a coil 87 and the like. The secured core 83 is formed of magnetic material, and provided oppositely to the suction valve member 74 relative to the movable core 84. The coil 87 is provided radially outside the secured core 83. The coil 87 is energized to magnetize the secured core 83. The magnetized secured core 83 attracts the movable core 84 against the biasing force of the second spring 88. The needle 86 moves together with the movable core 84 attracted by the secured core 83. Accordingly, the suction valve member 74 is permitted to move toward the valve seat 78. That is, the valve closing becomes possible.

The magnetic force of the secured core 83 is lost when the coil 87 is de-energized. The needle 86 moves to the suction valve member 74 by the biasing force of the second spring 88 when the magnetic attraction of the secured core 83 is lost. Accordingly, the suction valve member 74 is inhibited from moving toward the valve seat 78. That is, the valve opening is achieved.

Next, a structure of the suction valve portion 71 is explained in detail in reference to FIGS. 4 to 7.

The valve seat 78 has an inner passage 781 located radially inward and outer passages 782 located radially outward. The inner passage 781 is provided coaxially with the needle 86. The outer passages 782 are arcuate holes that extend circumferentially. Three outer passages 782 are formed equidistantly in the circumferential direction. The inner passage 781 and the outer passages 782 function as passages of fuel. The inner passage 781 functions also as an insertion hole for the needle 86.

The suction valve member 74 has, on its axial center, a fitting hole 741 to fit one end of the first spring 76. The fitting hole 741 is a blind hole. The suction valve member 74 has multiple bottomed holes 742 oppositely to the valve seat 78. Five bottomed holes 742 are formed equidistantly in the circumferential direction. The suction valve member 74 has first passages 743 penetrating from the radial inner portions of the bottom surfaces of the bottomed holes 742 toward the valve seat 78. The first passages 743 are located radially between the inner passage 781 and outer passages 782. The first passages 743 function as a fuel passage.

The suction valve member 74 forms a first projection portion 744 placed radially outside the first passages 743. The first projection portion 744 projects toward the pressurization chamber 14 relative to the first passages 743. The first projection portion 744 functions as a guide portion which guide the fuel flowing from the pressurization chamber 14 toward the suction valve member 74 into the first passages 743.

The spring guide 75 forms a fitting projection portion 753 to insert the other end of the first spring 76. The spring guide 75 has third passages 754 axially penetrating radially outside the fitting projection portion 753. Multiple third passages 754 are formed equidistantly in the circumferential direction.

A first wall 745 of the suction valve member 74 and a second wall 783 of the valve seat 78 face with each other and have flat surfaces. The first wall 745 of the suction valve member 74 has an annular first pressure equalization groove 746 communicating with the first passages 743 and encircling the inner passage 781. The second wall 783 of the valve seat 78 has: an annular first pressure equalization groove 784 communicating with the first passages 743 on both of valve opening and valve closing and encircling the inner passage 781; and an annular second pressure equalization groove 785 communicating with the outer passages 782 and encircling the first passages 743, the first pressure equalization groove 746, and the first pressure equalization groove 784. The first pressure equalization groove 746 and the first pressure equalization groove 784 are formed to radially overlap each other. The second wall 783 of the valve seat 78 has an annular groove 786 correspondingly to the outer periphery of the first wall 745 of the suction valve member 74.

The second wall 783 has a first seal portion 787, a second seal portion 788, and a third seal portion 789. The first seal portion 787 seals between the inner passage 781 and the first passages 743, the first pressure equalization groove 746, and the first pressure equalization groove 784 when the suction valve member 74 abuts the valve seat 78. The second seal portion 788 seals between the first passages 743, the first pressure equalization groove 746, and the first pressure equalization groove 784 and the outer passages 782 and the second pressure equalization grooves 785 when the suction valve member 74 abuts the valve seat 78. The third seal portion 789 seals between the outer passages 782 and the second pressure equalization groove 785 and a radially outside passage 80 located radially outside the suction valve member 74 when the suction valve member 74 abuts the valve seat 78. The suction valve portion 71 is a multi-sheet type valve having multiple seal portions.

Next, an operation of the high pressure pump 1 will be explained, hereinafter.

(I) Suction Stroke

When the plunger 21 moves downward from the top dead center toward the bottom dead center, a volumetric capacity of the pressurization chamber 14 increases and a pressure of fuel in the pressurization chamber 14 decreases. At this time, the discharge passage 95 is blocked by the discharge valve member 94. When the energization to the coil 87 is stopped, the needle 86 moves toward the suction valve member 74 by the second spring 88. Accordingly, the needle 86 presses the suction valve member 74 to open the suction valve portion 71. As a result, the fuel is introduced to the pressurization chamber 14 from the suction chamber 711 via the inlet port 141.

(II) Metering Stroke

Figure 8:
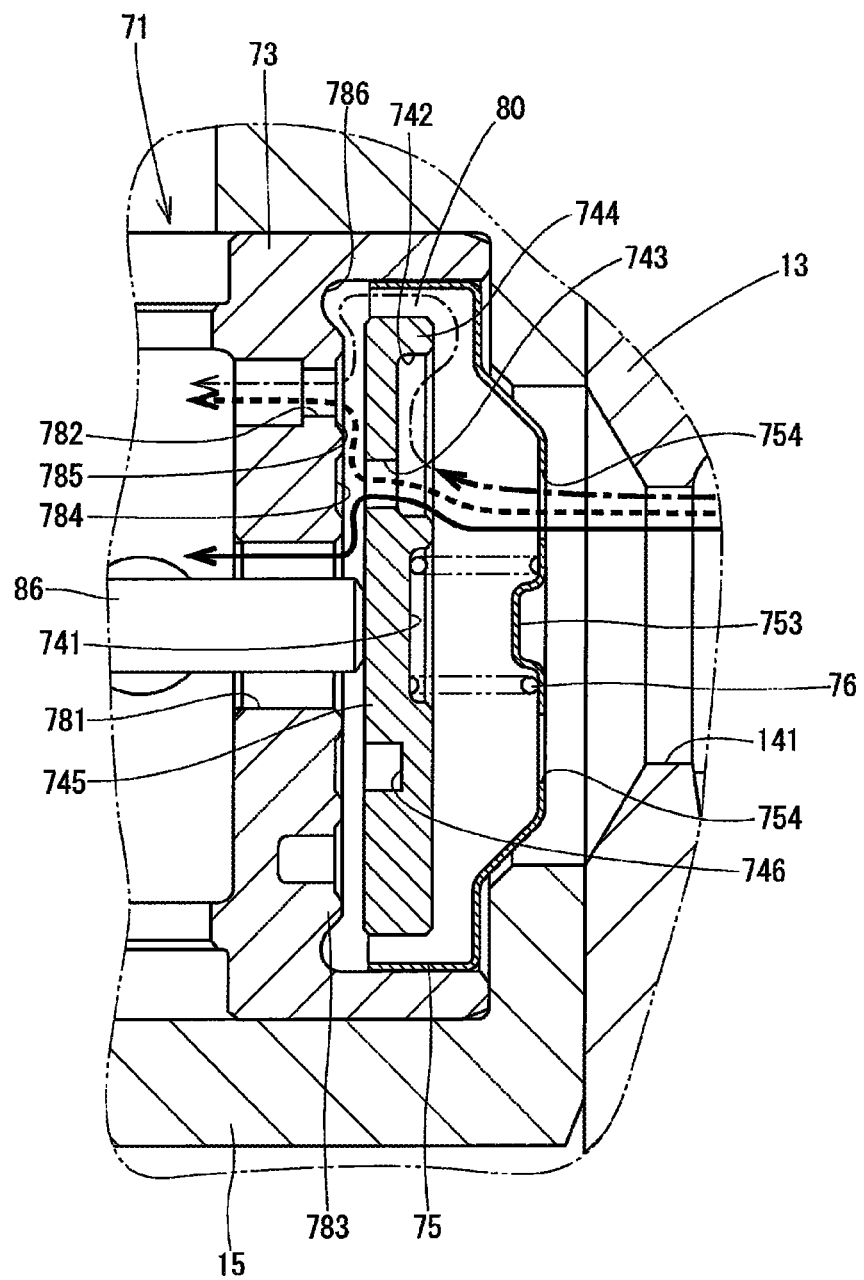
FIG. 8 shows a flow of fuel of the suction valve portion at the time of metering of the high pressure pump of FIG. 1.

When the plunger 21 moves upward from the bottom dead center toward the top dead center by rotation of the cam shaft, the volumetric capacity of the pressurization chamber 14 decreases. In that case, until a predetermined time, the energization of the coil 87 is stopped and the suction valve portion 71 is opened. Therefore, a part of the low pressure fuel introduced to the pressurization chamber 14 returns to the fuel supply side via the suction valve portion 71 in the suction stroke. At this time, the fuel flows to the inner passage 781 through the first passages 743, the first pressure equalization groove 746, and the first pressure equalization groove 784 as shown by the solid arrow in FIG. 8, flows to the outer passages 782 through the first passages 743, the first pressure equalization groove 746, and the first pressure equalization groove 784 as shown by the dotted arrow in FIG. 8, and flows to the outer passages 782 through a passage radially outside the suction valve member 74 and the second pressure equalization groove 785 as shown by the dashed arrow in FIG. 8.

At this time, the force by a pressure of the fuel that flows into the first pressure equalization groove 746, the first pressure equalization groove 784, and the second pressure equalization groove 785 is applied to the suction valve member 74 in the valve opening direction. The force in the valve opening direction is applied to the suction valve member 74 equally in the circumferential direction, and counterbalances the force received by the suction valve member 74 from the fuel flow toward the suction valve member 74 in the valve closing direction.

Then, magnetic attraction generates between the secured core 83 and movable core 84 by energizing the coil 87 at a predetermined time in the middle of the upward movement of the plunger 21. When this magnetic attraction becomes larger than a resultant force, which is the biasing force obtained by subtracting the biasing force of the first spring 76 from the second spring 88, the movable core 84 and needle 86 move to the secured core 83. Accordingly, a force of the needle 86 to the suction valve member 74 is released. As a result, the suction valve member 74 abuts the valve seat 78 by the biasing force of the first spring 76 and the dynamic pressure generated by the fuel flow, whereby the suction valve portion 71 is closed.

(III) Pressurization Stroke

After the suction valve portion 71 is closed, a volumetric capacity of the pressurization chamber 14 decreases together with upward movement of the plunger 21 and a pressure of the fuel in the pressurization chamber 14 increases. When the force applied to the discharge valve member 94 by the fuel pressure of the pressurization chamber 14 becomes larger than the sum of the biasing force of the discharge valve spring 943 and the force applied to the discharge valve member 94 by the fuel pressure on the side of a fuel outlet 99, the discharge valve member 94 is opened. Accordingly, the pressurized fuel pressurized in the pressurization chamber 14 is discharged from the fuel outlet 99 via the outlet port 142. The high pressure pump 1 repeats the suction stroke, the metering stroke, and the pressure stroke, meters and pressurizes the introduced fuel, and discharges the fuel from the fuel outlet 99.

As explained above, in the first embodiment, the valve seat 78 has the inner passage 781 located radially inside and the outer passages 782 located radially outside. The suction valve member 74 has the first passages 743 penetrating from the bottom surface of the bottomed holes 742 toward the valve seat 78. The first passages 743 are formed between the inner passage 781 and outer passages 782 in the radial direction. The first passages 743, the inner passage 781, and the outer passages 782 function as the fuel passages.

As a result, the same passage area as that in the structure having only the radially outside passage 80 can be obtained even when a lift amount L (refer to FIG. 4) from the valve seat 78 of the suction valve member 74 is made small at the time of valve opening. Therefore, the lift amount L can be made small, and the output of the electromagnetic driving unit 81, namely the attraction force, can be made small. Therefore, the electromagnetic driving unit 81 can be made compact by making the coil 87 compact. Additionally, the power consumption decreases due to small current applied to the coil 87 and the operation sound also becomes small. Since a drive circuit that controls the energization of the coil 87 may not need expensive elements, the manufacturing cost becomes inexpensive.

In the first embodiment, the first wall 745 of the suction valve member 74 has the annular first pressure equalization groove 746 communicating with the first passages 743 and encircling the inner passage 781. The second wall 783 of the valve seat 78 has: the annular first pressure equalization groove 784 communicating with the first passages 743 and encircling the inner passage 781 at the time of both of valve opening and valve closing; and the annular second pressure equalization groove 785 communicating with the outer passages 782 and enclosing the first passages 743, the first pressure equalization groove 746, and the first pressure equalization groove 784. The force by the pressure of fuel that flows into the first pressure equalization groove 746, the first pressure equalization groove 784, and the second pressure equalization groove 785 at the time of metering is applied to the suction valve member 74 in the valve opening direction. The force in the valve opening direction is applied to the suction valve member 74 equally in the circumferential direction, and counterbalances the force received by the suction valve member 74 from the flow of fuel toward the suction valve member 74 in the valve closing direction.

Therefore, even when the biasing force of the second spring 88 is small, the self-closing can be prevented. Therefore, since the attraction force of the electromagnetic driving unit 81 that moves the needle 86 against the biasing force of the second spring 88 can be made small, the electromagnetic driving unit 81 may be made further compact.

In the first embodiment, the first passages 743 are located radially inward in the bottom surfaces of the bottomed holes 742. The suction valve member 74 forms the first projection portion 744 that projects toward the pressurization chamber 14 relative to the first passages 743 radially outside the first passages 743. The first projection portion 744 functions as a guide means that guides, to the first passages 743, the fuel from the pressurization chamber 14 toward the suction valve member 74. The first projection portion 744 guides the fuel toward the suction valve member 74 to the first passages 743, so that the action force by the dynamic pressure on the suction valve member 74 in conjunction with a flow of fuel can be reduced.

Therefore, even when the biasing force of the second spring 88 is made smaller, the valve closing due to the dynamic pressure can be prevented. Therefore, since the attraction force of the electromagnetic driving unit 81 to move the needle 86 against the biasing force of the second spring 88 can be made smaller, the electromagnetic driving unit 81 can be made further compact.

In the first embodiment, the second wall 783 of the valve seat 78 has the annular groove 786 correspondingly to the peripheral portion of the first wall 745 of the suction valve member 74. The pressure of fuel in the annular groove 786 is applied to the suction valve member 74 in the valve opening direction. Therefore, since the valve closing due to the dynamic pressure can be further prevented, the electromagnetic driving unit 81 can be made further compact.

In the first embodiment, the first passages 743 are formed equidistantly in the circumferential direction. Therefore, the fuel that flows into the first pressure equalization groove 746, the first pressure equalization groove 784, and the second pressure equalization groove 785 can be made uniform in the circumferential direction.

In the first embodiment, the first wall 745 and the second wall 783 are formed flat and in parallel. Therefore, the sealing of the suction valve member 74 and valve seat 78 may be ensured, and the first seal portion 787, the second seal portion 788, and the third seal portion 789 may be produced at low cost.

Second Embodiment

Figure 9:
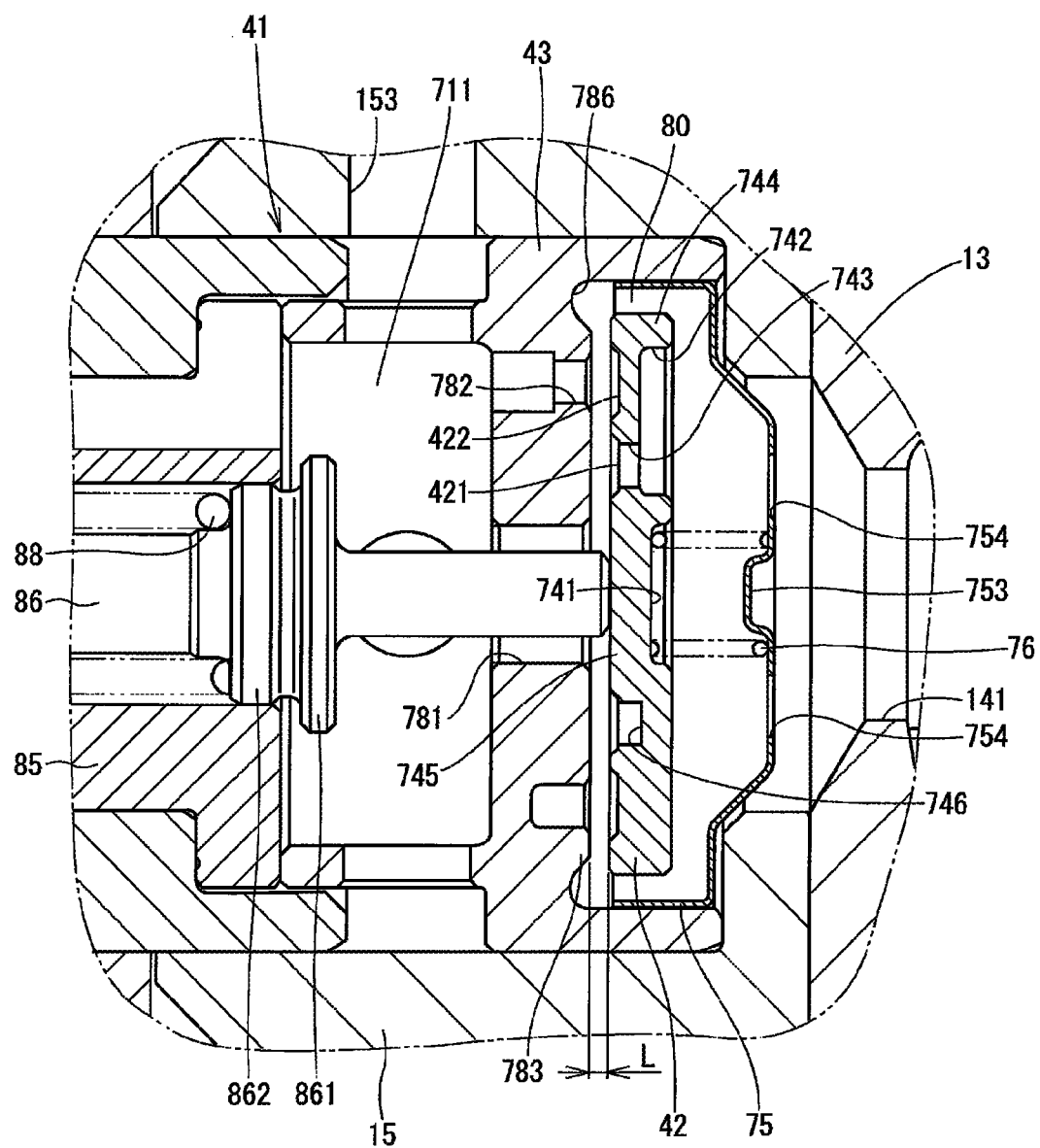
FIG. 9 is a sectional view of a suction valve portion of a high pressure pump of a second embodiment of the present invention.

A suction valve portion of the second embodiment will be explained in reference to FIG. 9. A first pressure equalization groove 421 and a second pressure equalization groove 422 of a suction valve portion 41 are formed to a suction valve member 42. Therefore, since the suction valve member 42 is made lighter in weight, the attraction force of the electromagnetic driving unit may be made smaller. Therefore, the downsizing of the electromagnetic driving unit is realized. The process cost of the second suction valve body 43 can be decreased.

Third Embodiment

Figure 10:
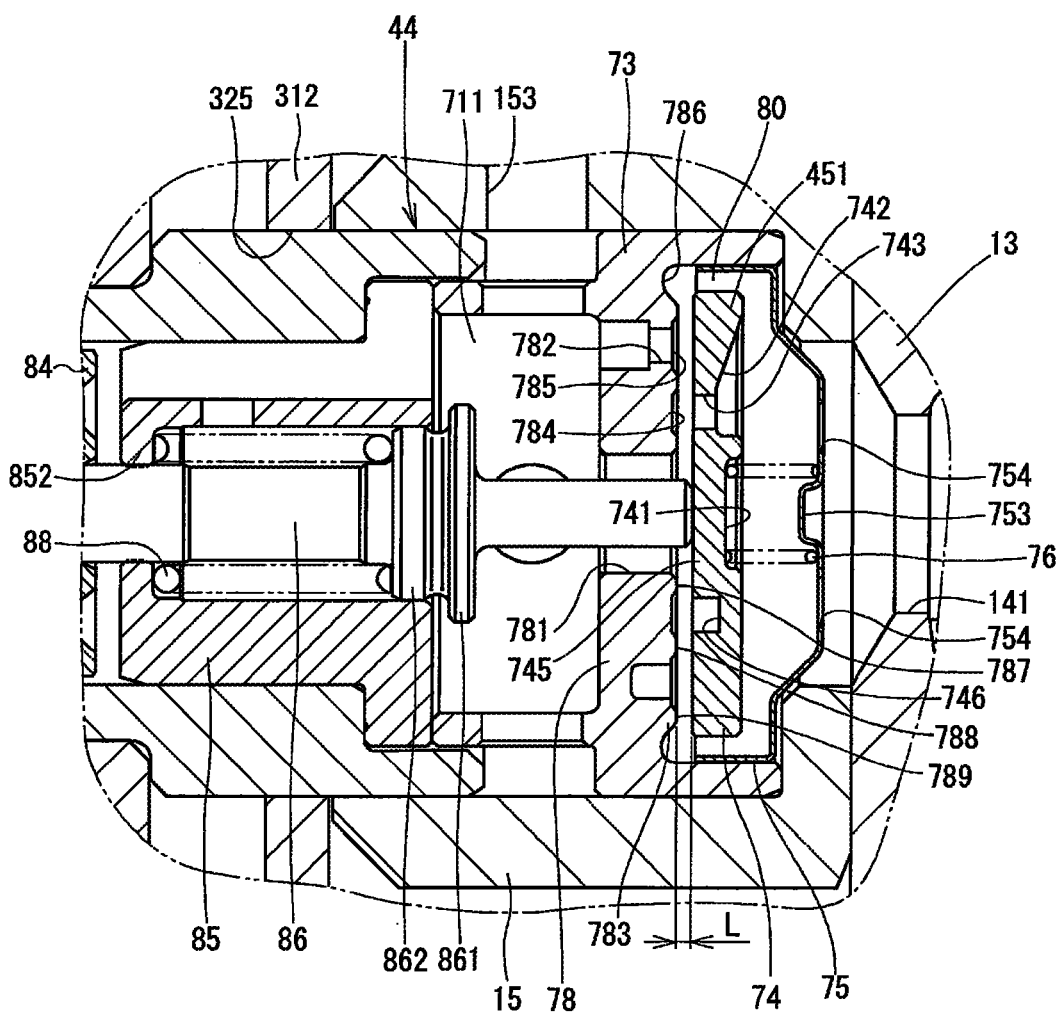
FIG. 10 is a sectional view of a suction valve portion of a high pressure pump of a third embodiment of the present invention.

A suction valve portion of a third embodiment of the present invention will be explained in reference to FIG. 10. A radially inner wall of a first projection portion 451 of a suction valve member 74 of the suction valve portion 44 is nearer to the first passages 743 toward the valve seat 78. Therefore, the fuel from the pressure chamber toward the first projection portion 451 is introduced radially inward along the radially inner wall of the first projection portion 451. Therefore, the fuel from the pressure chamber toward the suction valve member 74 at the time of metering can be smoothly guided to the first passages 743.

Fourth Embodiment

A suction valve portion of a fourth embodiment of the present invention will be explained in reference to FIGS. 11A, 11B, and 11C. A suction valve member 46 has a first disk member 461 and a second disk member 462 that are laminated. The suction valve member 46 forms a first projection portion 744. The first projection portion 744 functions as a guide portion. The first disk member 461 and the second disk member 462 are molded by pressing and then joined by adhesion, welding, or diffused junction, for example. Since the second disk member 462 does not relate to the abutment of the seal portions, it may be constituted by mold of resin. Therefore, the cutting process with high process cost may be decreased and the suction valve member 46 can be manufactured at low cost.

Fifth Embodiment

A suction valve member of a suction valve portion of the fifth embodiment will be explained in reference to FIGS. 12A, 12B, and 12C. A suction valve member 47 has a first disk member 471 and a second disk member 472 that are combined. The suction valve member 47 has a first passage 473 that functions as a passage of fuel. The suction valve member 47 forms a first annular projection portion 474 radially outward of the first passage 473. The first projection portion 474 functions as a guide portion. After the first disk member 471 and the second disk member 472 are molded by pressing and then joined by press fit, adhesion, welding, or diffused junction, for example. The second disk member 472 may be constituted by mold of resin because it does not relate to the abutment of the seal portions. Therefore, as in the fourth embodiment, the cutting process with high process cost may be decreased, and the suction valve member 47 can be manufactured at low cost.

Sixth Embodiment

A suction valve member of a suction valve portion of the sixth embodiment of the present invention is explained in reference to FIGS. 13A, 13B, and 13C. A suction valve member 48 has a first disk member 481 and a second disk member 482 that are laminated. The suction valve member 48 has first passages 483 that function as passages of fuel. The suction valve member 48 forms a first projection portion 484 radially outward of the first passages 483. The first projection portion 484 functions as a guide portion. The first disk member 481 and the second disk member 482 are molded by pressing and then joined by adhesion, welding, or diffused junction, for example. The second disk member 482 may be constituted by mold of resin because it does not relate to the abutment of the seal portions. Therefore, as in the fourth embodiment, the cutting process with high process cost is reduced and thus the suction valve member 48 can be manufactured at low cost.

Seventh Embodiment

Figure 14A:
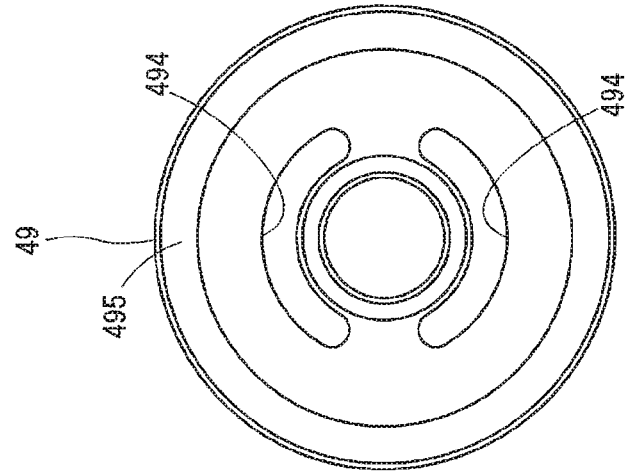
FIG. 14A is a view showing a suction valve member viewed from an arrow "XIVa" of a longitudinal sectional view of the suction valve member according to a seventh embodiment.
Figure 14B:
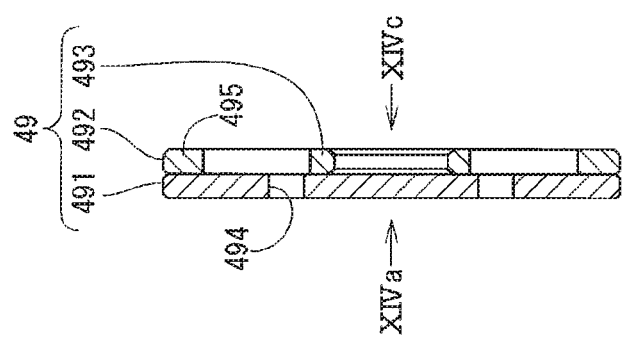
FIG. 14B is a longitudinal sectional view of the suction valve member.
Figure 14C:
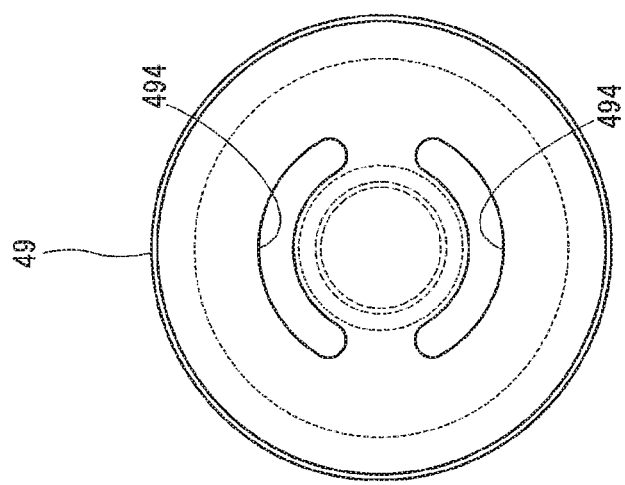
FIG. 14C is a view showing the suction valve member viewed from an arrow "XIVc" of the longitudinal sectional view.

A suction valve member of a suction valve portion of a seventh embodiment of the present invention is explained in reference to FIGS. 14A, 14B, and 14C. A suction valve member 49 has a disk member 491, a first annular member 492, and a second annular member 493 that are laminated.

The suction valve member 49 has first passages 494 that function as passages of fuel. The suction valve member 49 forms a first projection portion 495 radially outward of the first passages 494. A first projection portion 495 functions as a guide portion. The disk member 491, the first annular member 492, and the second annular member 493 are molded by pressing, and then joined by adhesion, welding, or diffused junction, for example. The second annular member 492 may be constituted by mold of resin because it does not relate to the abutment of the seal portions.

Therefore, as in the fourth embodiment, the cutting process with high process cost can be reduced and the suction valve member 49 may be manufactured inexpensively. The second annular member 492 and the third annular member 493 have simpler shapes and are easier to manufacture.

Eighth Embodiment

Figure 15:
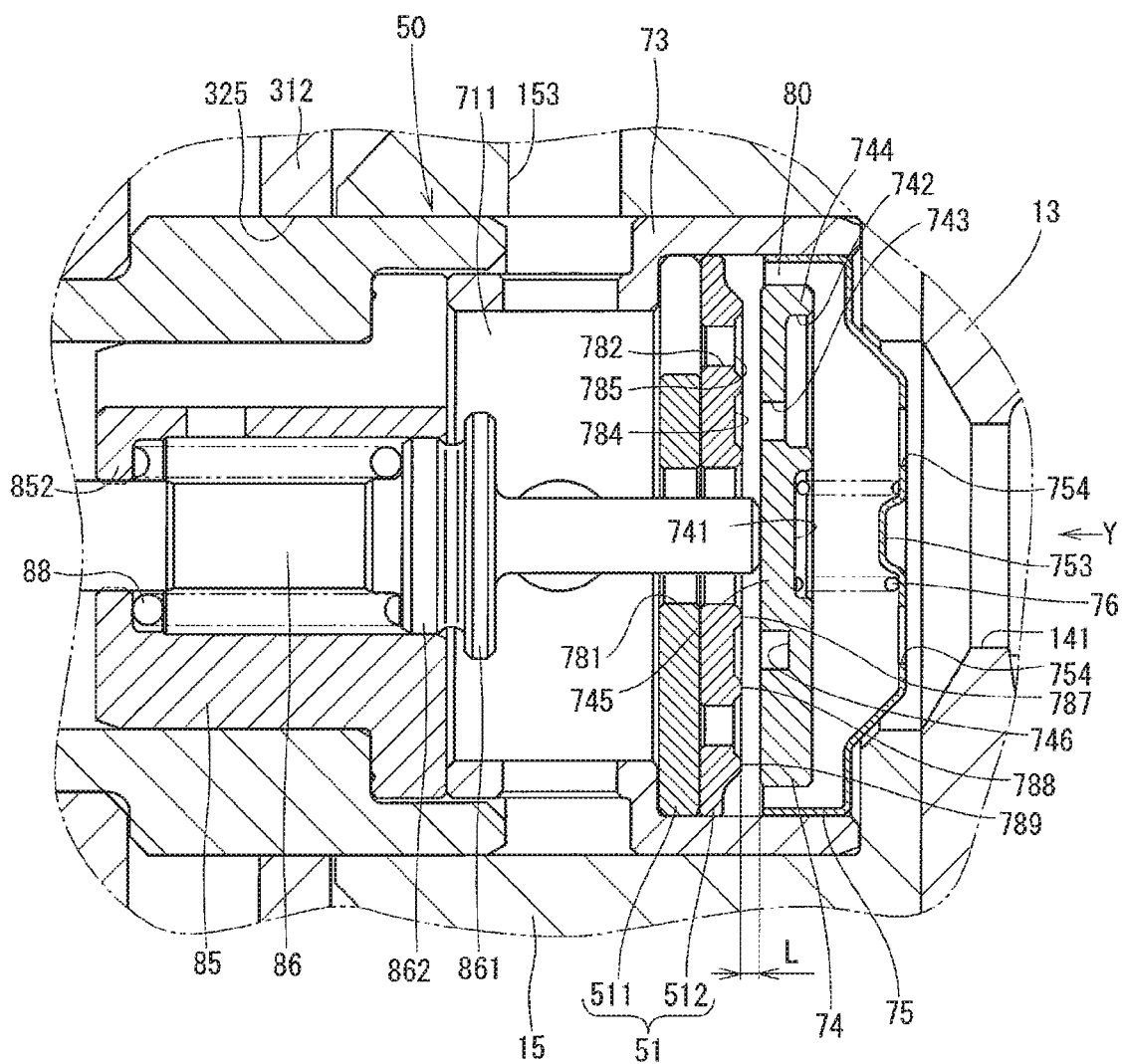
FIG. 15 is a sectional view of a suction valve portion of a high pressure pump of an eighth embodiment of the present invention.
Figure 16:
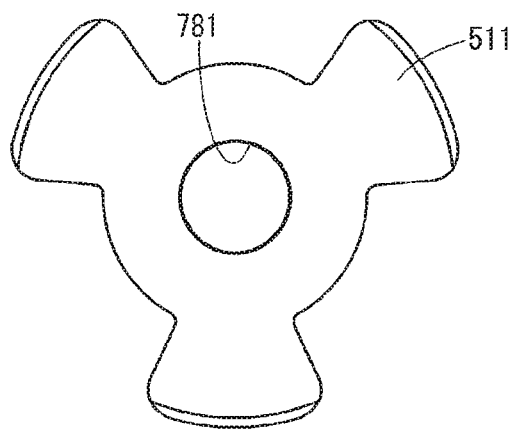
FIG. 16 is a front view of a first disk member viewed from an arrow "Y" in FIG. 15.
Figure 17:
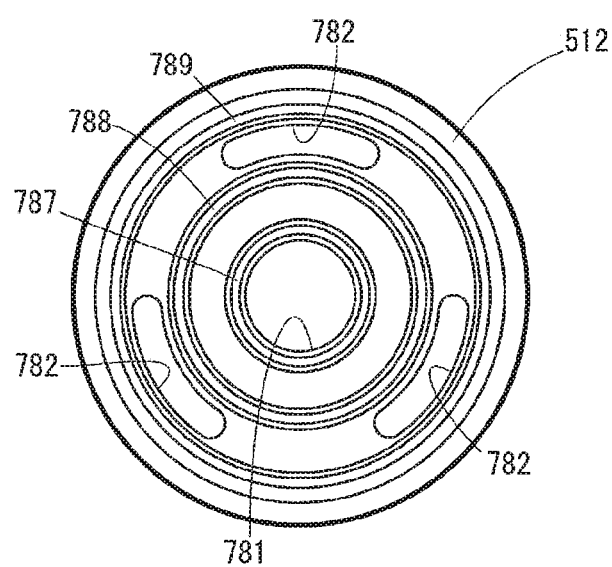
FIG. 17 is a front view of a second disk member viewed from an arrow "Y" in FIG. 15.

A suction valve portion of an eighth embodiment of the present invention is explained in reference to FIGS. 15 to 17. A valve seat 51 of a suction valve portion 50 has a first disk member 511 and a second disk member 512 that are laminated. The first disk member 511 and the second disk member 512 are molded by pressing, and then joined by adhesion, welding, or diffused junction, for example. Therefore, the cutting process with high process cost may be reduced, and the valve seat 51 can be manufactured inexpensively.

Ninth Embodiment

Figure 18:
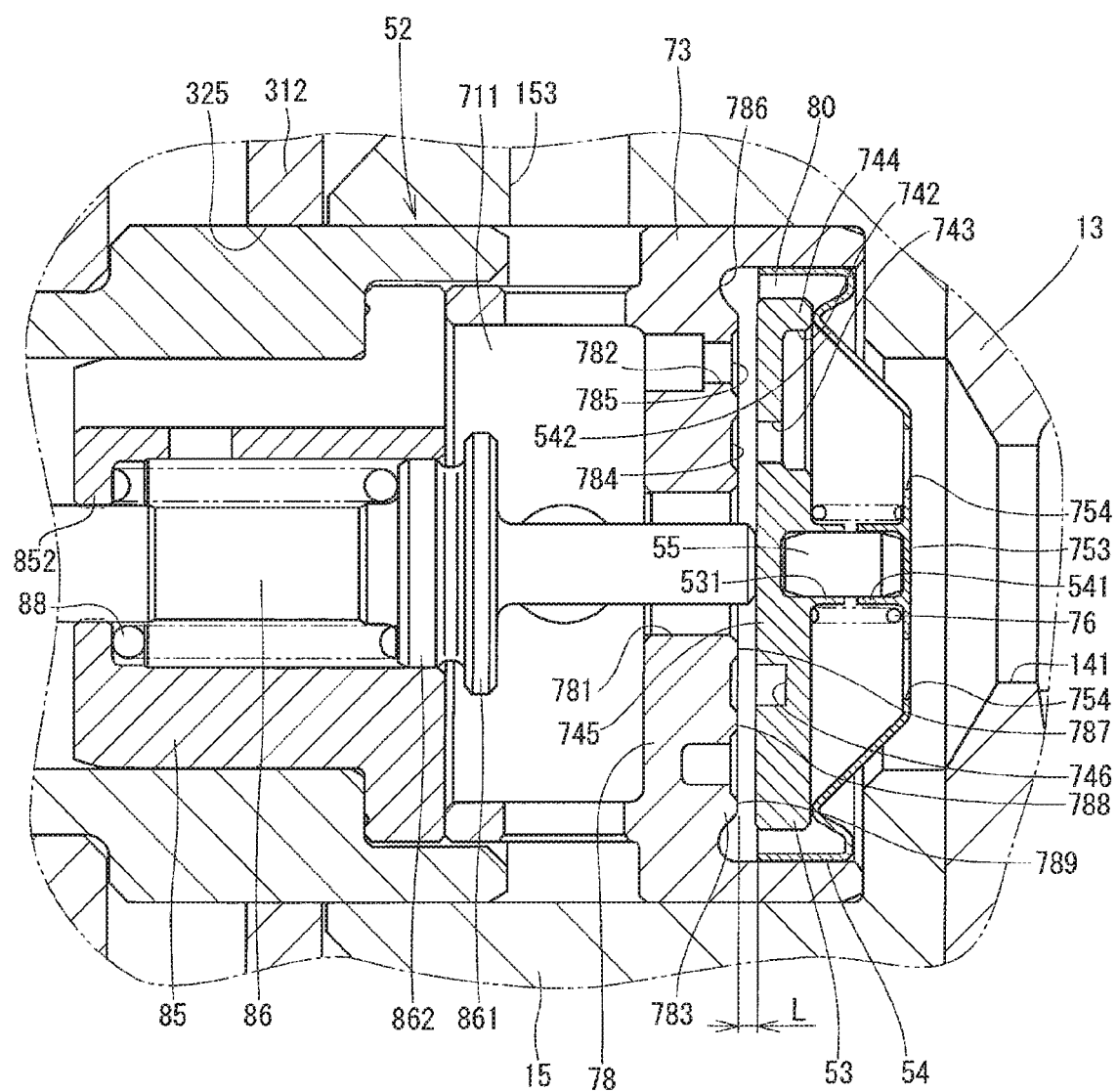
FIG. 18 is a sectional view of a suction valve portion of a high pressure pump of a ninth embodiment of the present invention.

A suction valve portion of a ninth embodiment of the present invention is explained in reference to FIG. 18. A suction valve member 53 of a suction valve portion 52 forms an annular pin guide portion 531 that projects toward a spring guide 54. The spring guide 54 forms an annular pin guide portion 541 that projects toward the suction valve member 53. A locating pin 55 as a "guide portion" fits into the pin guide portions 531 and 541. The radial movement of the suction valve member 53 is inhibited by the locating pin 55 to be able to axially move stably.

The spring guide 54 forms a second annular projection portion 542 which is radially outward of the first passages 743 and which projects toward the suction valve member 53. A top of the second projection portion 542 can abut against the first projection portion 744 of the suction valve member 53 at the time of valve opening. The second projection portion 542 functions as an inhibit portion to inhibit the opposite movement of the suction valve member 53 to the valve seat 78 and to guide, to the first passages 743, the fuel from the pressure chamber toward the suction valve member 53 at the time of metering.

Tenth Embodiment

Figure 19:
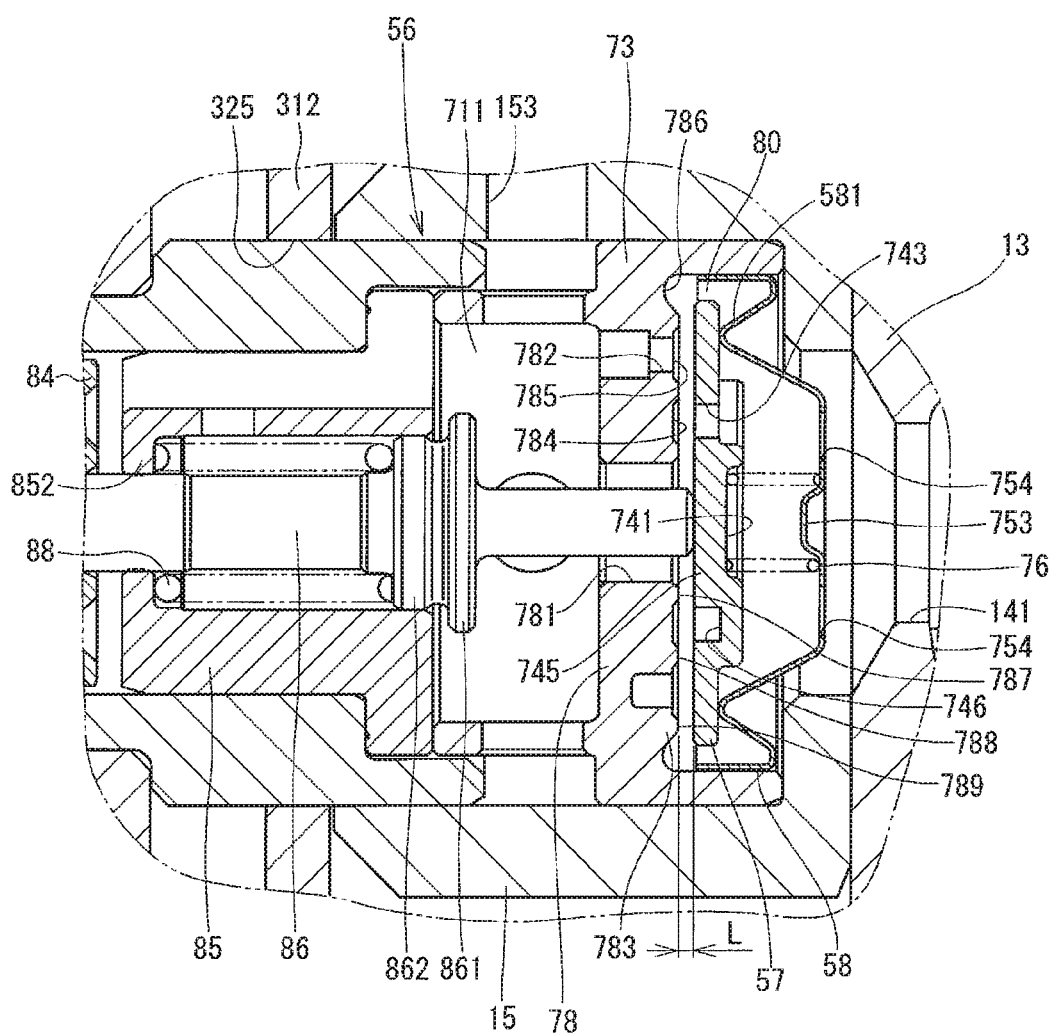
FIG. 19 is a sectional view of a suction valve portion of a high pressure pump of a tenth embodiment of the present invention.

A suction valve portion of a tenth embodiment of the present invention is explained in reference to FIG. 19. A suction valve member 57 of a suction valve portion 56 has the same structure as the suction valve member 74 of the first embodiment except the suction valve member 57 does not form the first projection portion 744 thereto. A spring guide 58 forms a second annular projection portion 581 that is radially outward of the first passages 743 and that projects toward the suction valve member 57. The second projection portion 581 functions as a guide portion to inhibit the opposite movement of the suction valve member 57 to the valve seat 78 and to guide, to the first passages 743, the fuel from the pressure chamber toward the suction valve member 57 at the time of metering.

Eleventh Embodiment

Figure 20:
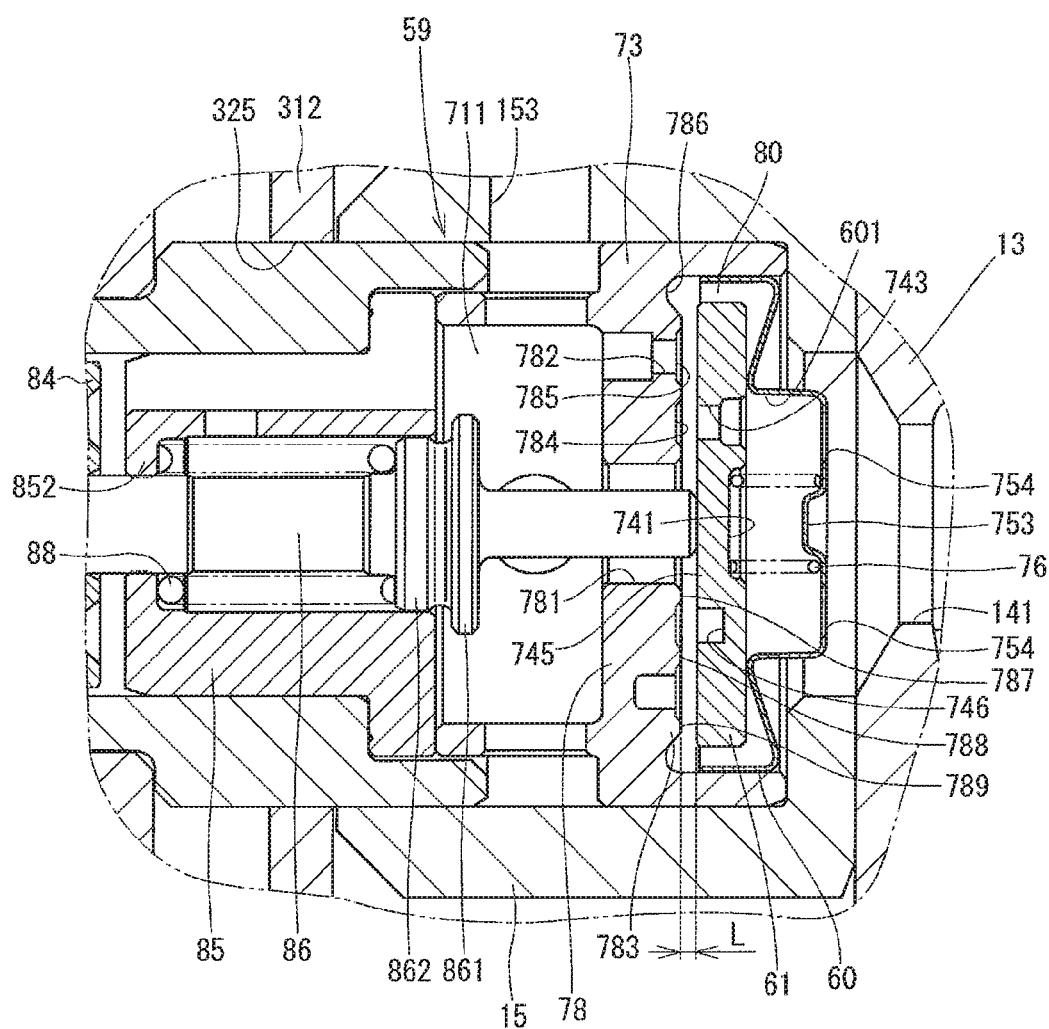
FIG. 20 is a sectional view of a suction valve portion of a high pressure pump of an eleventh embodiment of the present invention.

A suction valve portion of an eleventh embodiment of the present invention is explained in reference to FIG. 20. A top of a second projection portion 601 formed by a spring guide 60 of a suction valve portion 59 is located radially inward of the outer passages 782. Therefore, the top of the second projection portion 601 is provided near the first passages 743. Therefore, the fuel from the pressure chamber toward the suction valve member 61 at the time of metering is smoothly guided to the first passages 743 by the second projection portion 601.

Twelfth Embodiment

Figure 21:
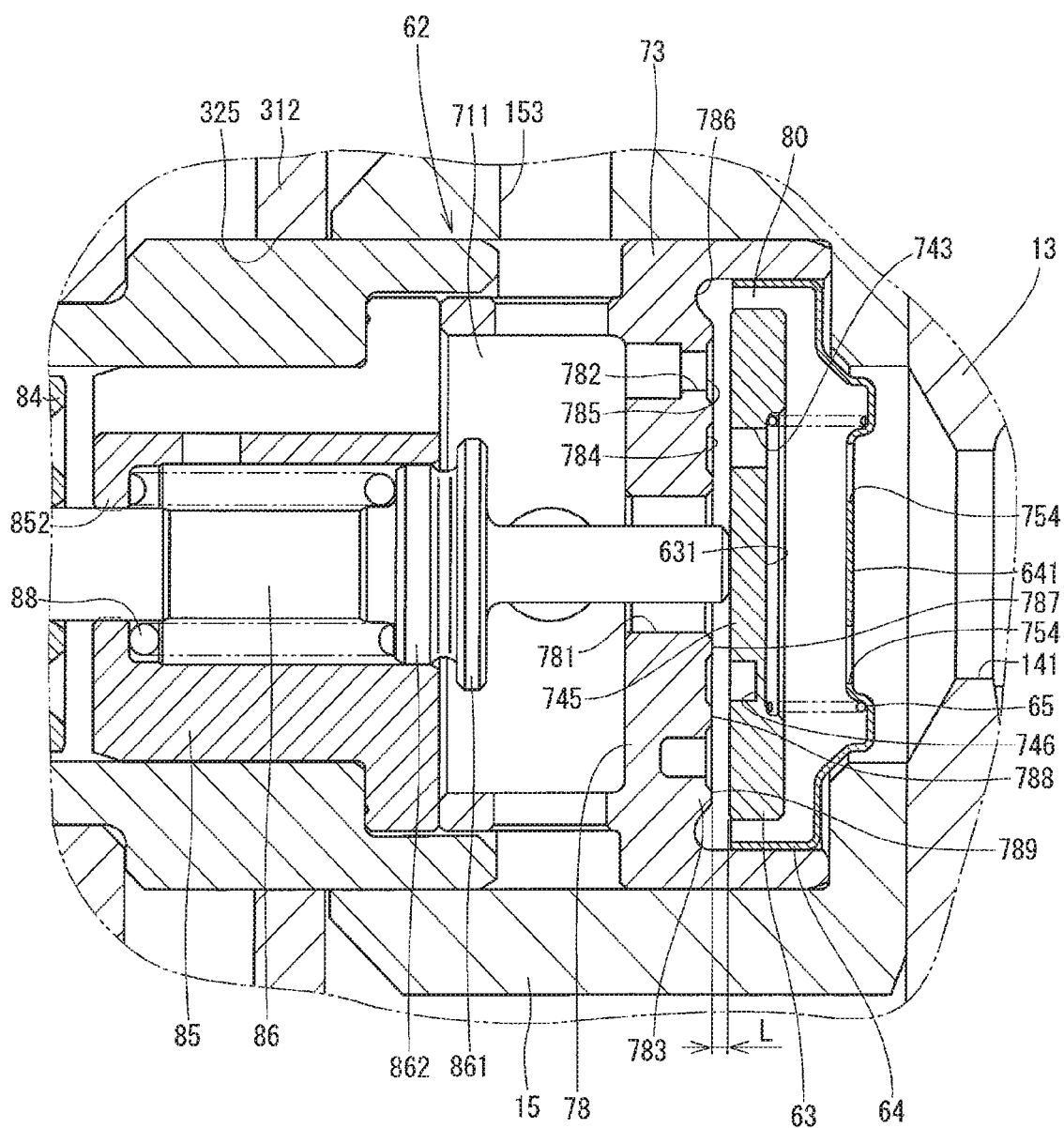
FIG. 21 is a sectional view of a suction valve portion of a high pressure pump of a twelfth embodiment of the present invention.

A suction valve portion of a twelfth embodiment of the present invention is explained in reference to FIG. 21. A suction valve member 63 of a suction valve portion 62 has a fitting hole 631 of a first spring 65. A spring guide 64 forms a fitting projection portion 641 to fit the first spring 65. The first spring 65 between the suction valve member 63 and spring guide 64 is formed to encircle the first passages 743 and the third passages 754. The fuel that flows from the pressure chamber into the spring guide 64 through the third passages 754 at the time of metering is inhibited from flowing radially outward by the first spring 65. For this reason, the first spring 65 functions as a guide portion to guide, to the first passages 743, the fuel from the pressure chamber toward the suction valve member 63.

Modification of Twelfth Embodiment

Figure 22:
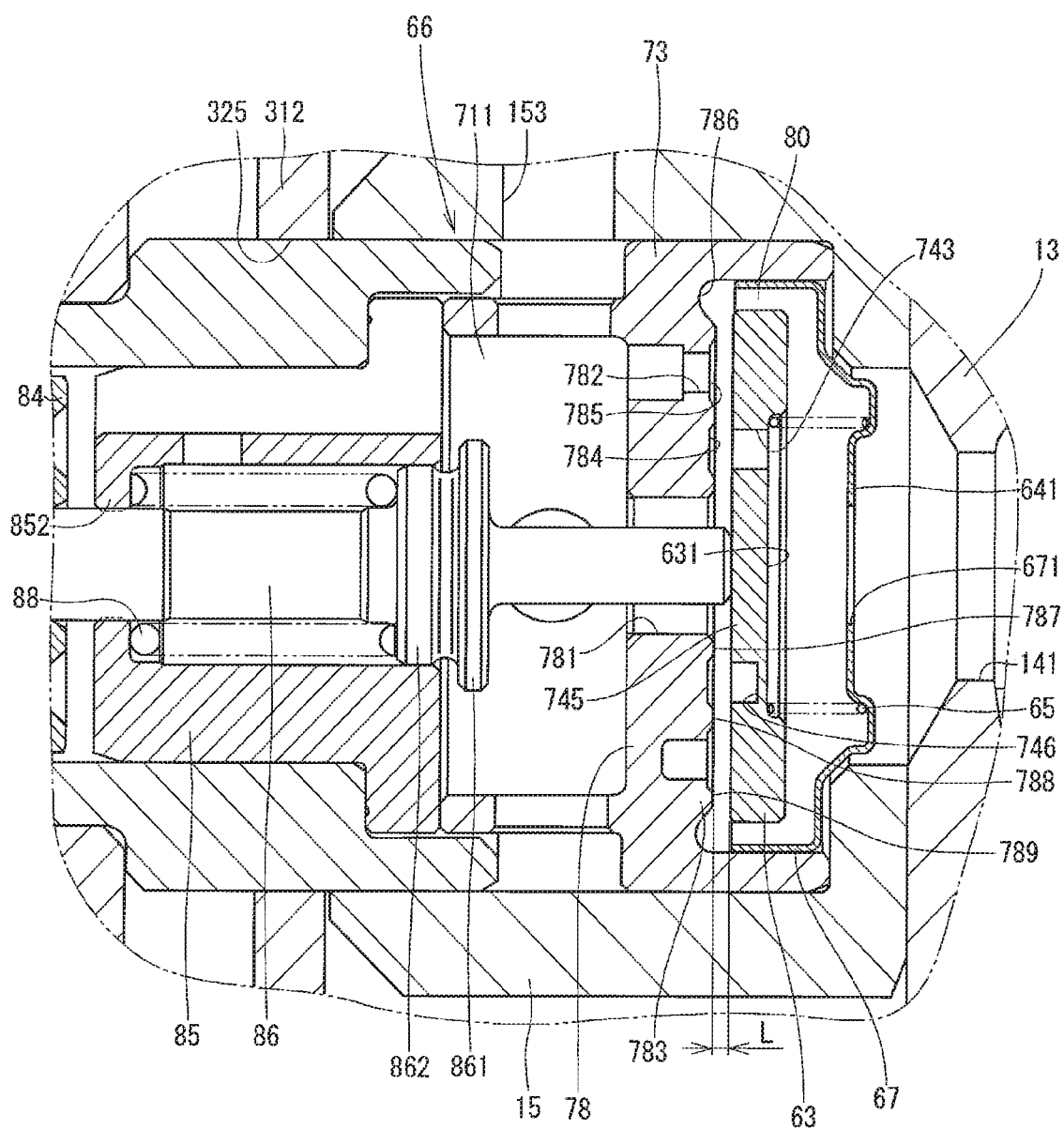
FIG. 22 is a sectional view of a suction valve portion of a high pressure pump of a modification of a twelfth embodiment of the present invention.

A suction valve portion of a modification of a twelfth embodiment is explained in reference to FIG. 22. A third passage 671 of a spring guide 67 of a suction valve portion 66 differs from the third passage 754 of the spring guide 64 of the twelfth embodiment. The third passage 671 is provided in the axial center of the spring guide 67. The flow of fuel that flows into the spring guide 67 through the third passage 671 in the radial direction is inhibited by the first spring 65 as in the twelfth embodiment.

Thirteenth Embodiment

Figure 23:
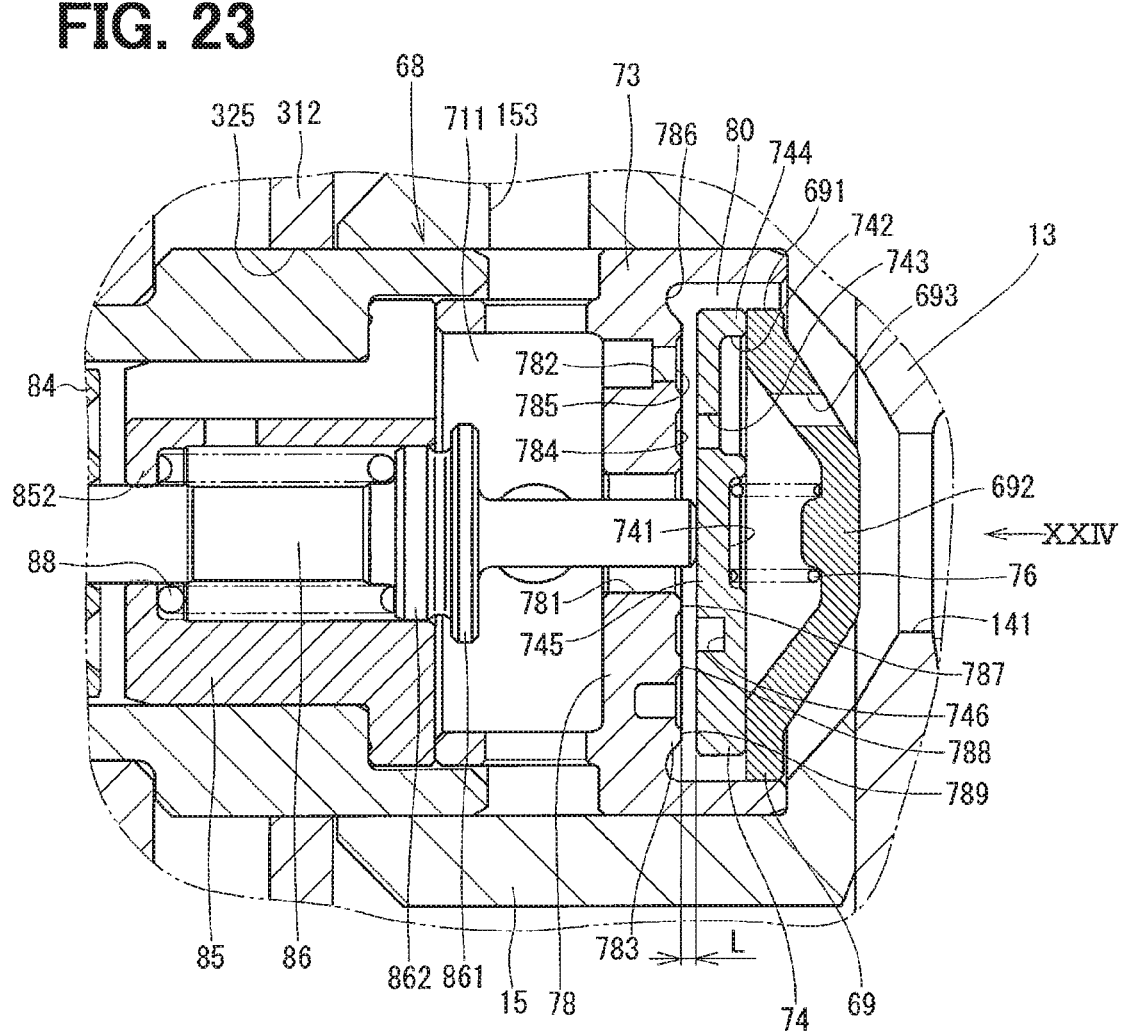
FIG. 23 is a sectional view of a suction valve portion of a high pressure pump of a thirteenth embodiment of the present invention.
Figure 24:
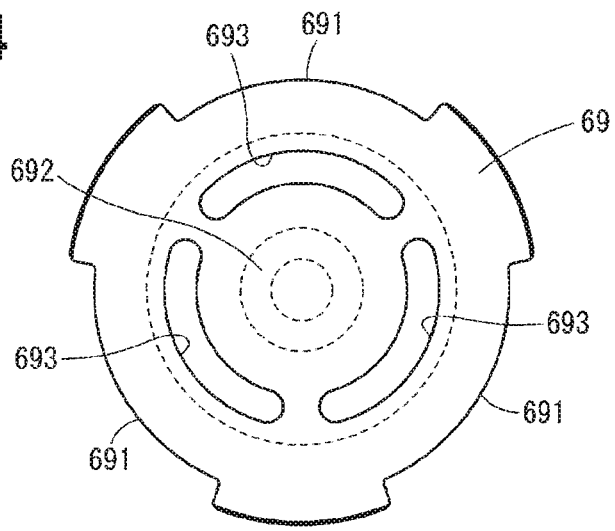
FIG. 24 is a stopper viewed from an arrow "XXIV" in FIG. 23.
Figure 25:
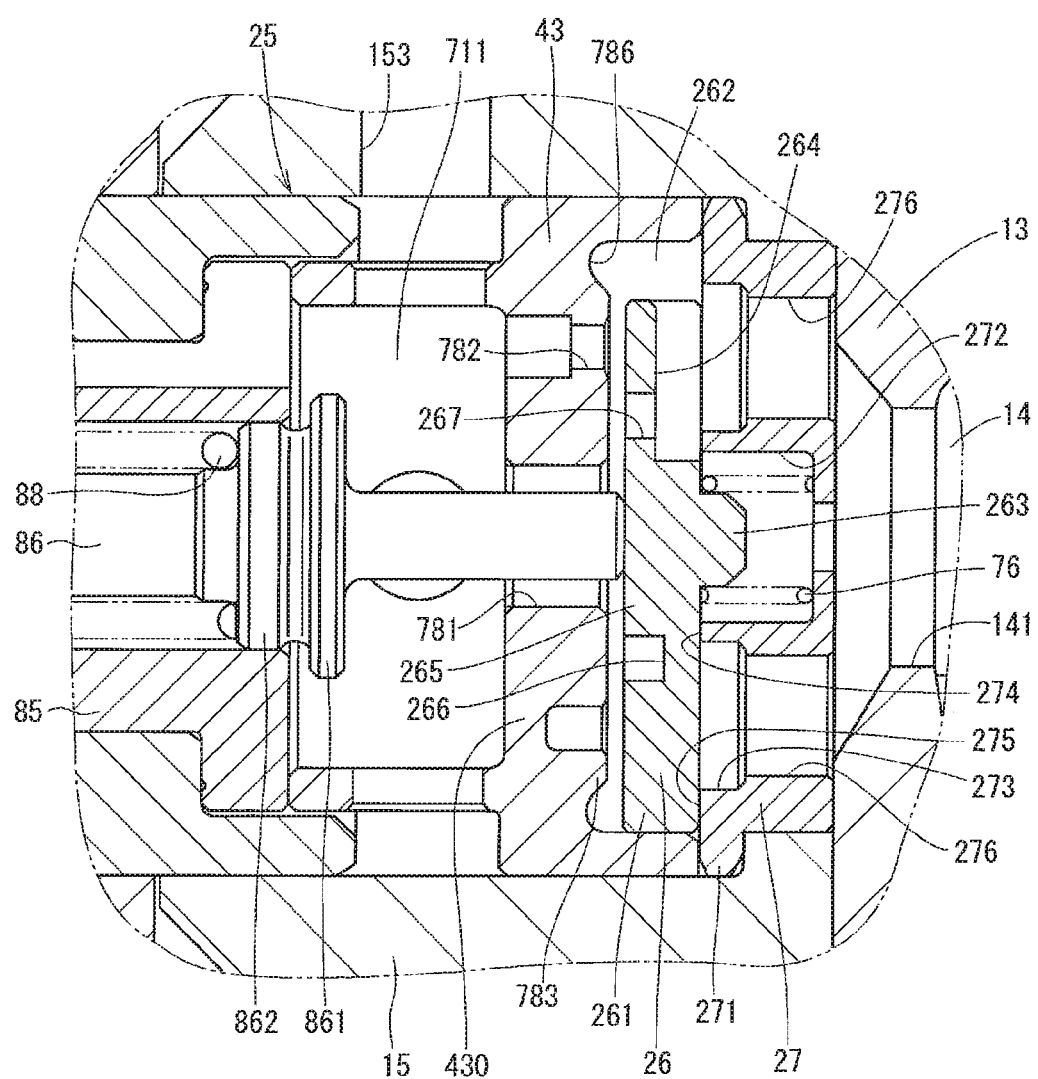
FIG. 25 is a sectional view of a suction valve portion of a high pressure pump of a fourteenth embodiment of the present invention.
Figure 26A:
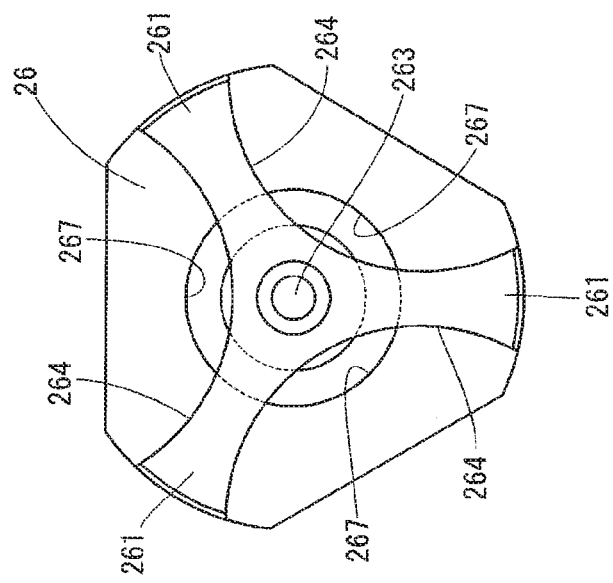
FIG. 26A is a view showing a stopper viewed from an arrow "a" of a longitudinal sectional view of the stopper according to a fourteen embodiment.
Figure 26B:
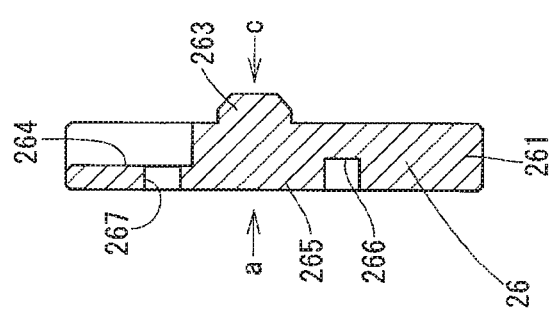
FIG. 26B is a longitudinal sectional view of the stopper.
Figure 26C:
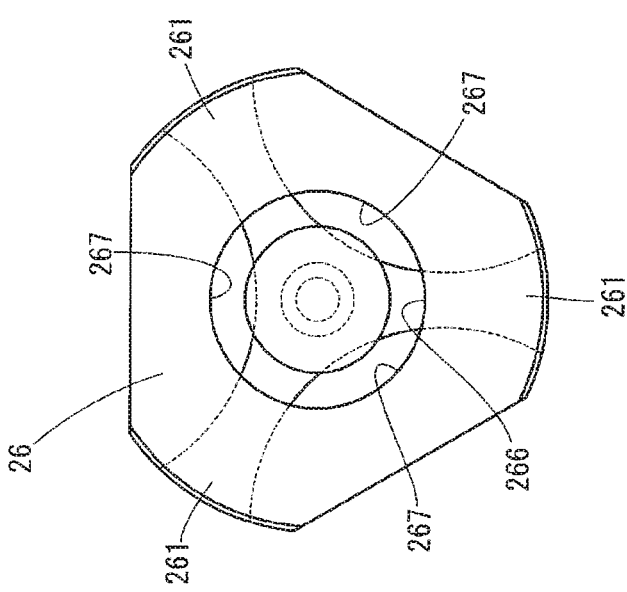
FIG. 26C is a view showing the stopper viewed from an arrow "c" of the longitudinal sectional view.

A suction valve portion of a thirteenth embodiment of the present invention is explained in reference to FIGS. 23 and 24. A suction valve portion 68 has a stopper 69 located oppositely to the valve seat 78 relative to the suction valve member 74. The stopper 69 has a disk shape, and abuts the suction valve member 74 at the time of valve opening to inhibit movement of the suction valve member 74 in the valve opening direction. The stopper 69 has grooves 691 that extend circumferentially on its radial outside. Three grooves 691 are formed equidistantly in the circumferential direction, and functions as passages of fuel. The stopper 69 has an axial center portion 692 that projects oppositely to the suction valve member 74. A first spring 76 is formed between the suction valve member 74 and axial center portion 692 of the stopper 69. The stopper 69 has through-holes 693 in positions that overlap with the first passages 743 of the suction valve member 74 when axially viewed. Three through holes 693 are formed equidistantly in the circumferential direction.

The fuel from the pressure chamber toward the suction valve member 74 at the time of metering flows between the stopper 69 and the suction valve member 74 through the through-holes 693. The fuel which flows between the stopper 69 and the suction valve member 74 is prevented from flowing out in the radially outer direction by the first projection portion 744 and the stopper 69, and guided to the first passages 743. In the thirteenth embodiment, the stopper 69 and the first projection portion 744 function as a guide portion to guide fuel to the first passages 743.

Fourteenth Embodiment

A suction valve portion of a fourteenth embodiment of the present invention is explained in reference to FIGS. 25 to 27B. A suction valve portion 25 has a suction valve member 26 and a stopper 27. The suction valve member 26 is located on the side of the pressurization chamber 14 relative to a valve seat 430, and can abut against and move away from the valve seat 430. The suction valve member 26 moves away from the valve seat 430 to communicate the suction chamber 711 with the pressurization chamber 14, and abuts the valve seat 430 to block the suction chamber 711 from the pressurization chamber 14.

The suction valve member 26 forms projection portions 261 projecting radially outward to narrow a radially outside passage 262 placed radially outside the suction valve member 26. Three projection portions 261 are formed equidistantly in the circumferential direction. Radially outer walls of the projection portions 261 are slidable on the inner wall of the second suction valve body 73.

The suction valve member 26 forms, on its axial center, a fitting projection portion 263 to fit one end of the first spring 76. The suction valve member 26 has, on its wall opposite to the valve seat 430, notch grooves 264 that are notched from radially outside at circumferential locations corresponding to the radially outside passage 262. The notch grooves 264 are formed equidistantly in the circumferential direction.

A first wall 265 of the suction valve member 26 facing a second wall 783 of the valve seat 78 is located between the inner passage 781 and the outer passages 782 in the radial direction, and has an annular first pressure equalization groove 266 encircling the inner passage 781.

The suction valve member 26 has a first passage 267 that communicates the first pressure equalization groove 266 and notch grooves 264 with each other. The first passage 267 is located between the inner passage 781 and the outer passages 782 in the radial direction. The first passage 267 functions as a fuel passage and an inlet port that introduces fuel to each pressure equalization groove.

The projection portions 261 inhibit, from flowing toward the radially outside passage 262, the flow of fuel flowing from the pressurization chamber 14 toward the suction valve member 26, and functions as a guide portion to guide fuel to the first passage 267. It is easier for the fuel flowing from the pressurization chamber 14 toward the suction valve member 26 to flow to the first passage 267 than to the radially outside passage 262 narrowed by the projection portions 261.

The stopper 27 is formed on the side of the pressurization chamber 14 relative to the second suction valve body 73. The stopper 27 forms a collar 271 projecting radially outward, and is secured by pinching the flange 271 between the second suction valve body 73 and the upper housing 15.

The stopper 27 has, on its wall facing the suction valve member 26, a receiving hole 272 that receives the first spring 76, and has an annular groove 273 that has an annular shape to encircle the receiving hole 272. An inner abutment portion 274 that can abut against the radial inside portion of the suction valve member 26 is formed between the receiving hole 272 and annular groove 273 in the radial direction. An outer abutment portion 275 that can abut against the radial outside portion of the suction valve member 26 is formed radially outside the annular groove 273. The stopper 27 inhibits the opposite movement of the suction valve member 26 toward the valve seat 430 when the inner abutment portion 274 and outer abutment portion 275 abut against the suction valve member 26.

The stopper 27 has second passages 276 penetrating from the bottom surface of the annular groove 273 toward the suction valve member 26 radially between the inner abutment portion 274 and the outer abutment portion 275. Four second passages 276 are formed equidistantly in the circumferential direction.

In the fourteenth embodiment, the stopper 27 has the inner abutment portion 274 that can abut against the radial inside portion of the suction valve member 26 and the outer abutment portion 275 that may abut against the radial outside portion of the suction valve member 26. Therefore, when the suction valve member 26 abuts the stopper 27, the pressure force of the suction valve member 26 is applied over the stopper 27 without concentrating only on the radial inside portion of the stopper 27. A counter force to the above pressure is applied over the suction valve member 26 without concentrating only on the radial outside portion of the suction valve member 26.

Therefore, required mechanical strengths of the suction valve member 26 and stopper 27 become lower, whereby the suction valve member 26 and the stopper 27 can be made smaller and the body of the suction valve portion 25 can be made small. The suction valve member 26 is constituted light in weight, so that the pump efficiency improves, and vibration and noise are suppressed. Axial runout of the suction valve member 26 at the time of valve opening is inhibited, and the pump efficiency improves.

In the fourteenth embodiment, the stopper 27 has the second passages 276 between the inner abutment portion 274 and outer abutment portion 275 of the stopper 27 in the radial direction. Accordingly, the fuel from the pressurization chamber 14 toward the stopper 27 is guided to the first passage 267 of the suction valve member 26 via the second passages 276.

In the fourteenth embodiment, the first spring 76 is provided radially inside the inner abutment portion 274 of the stopper 27. Therefore, without forming a space to receive the first spring 76 separately, the space radially inside the inner abutment portion 274 is effectively utilized so that the first spring 76 can be placed.

Modification of Fourteenth Embodiment

Figure 28:
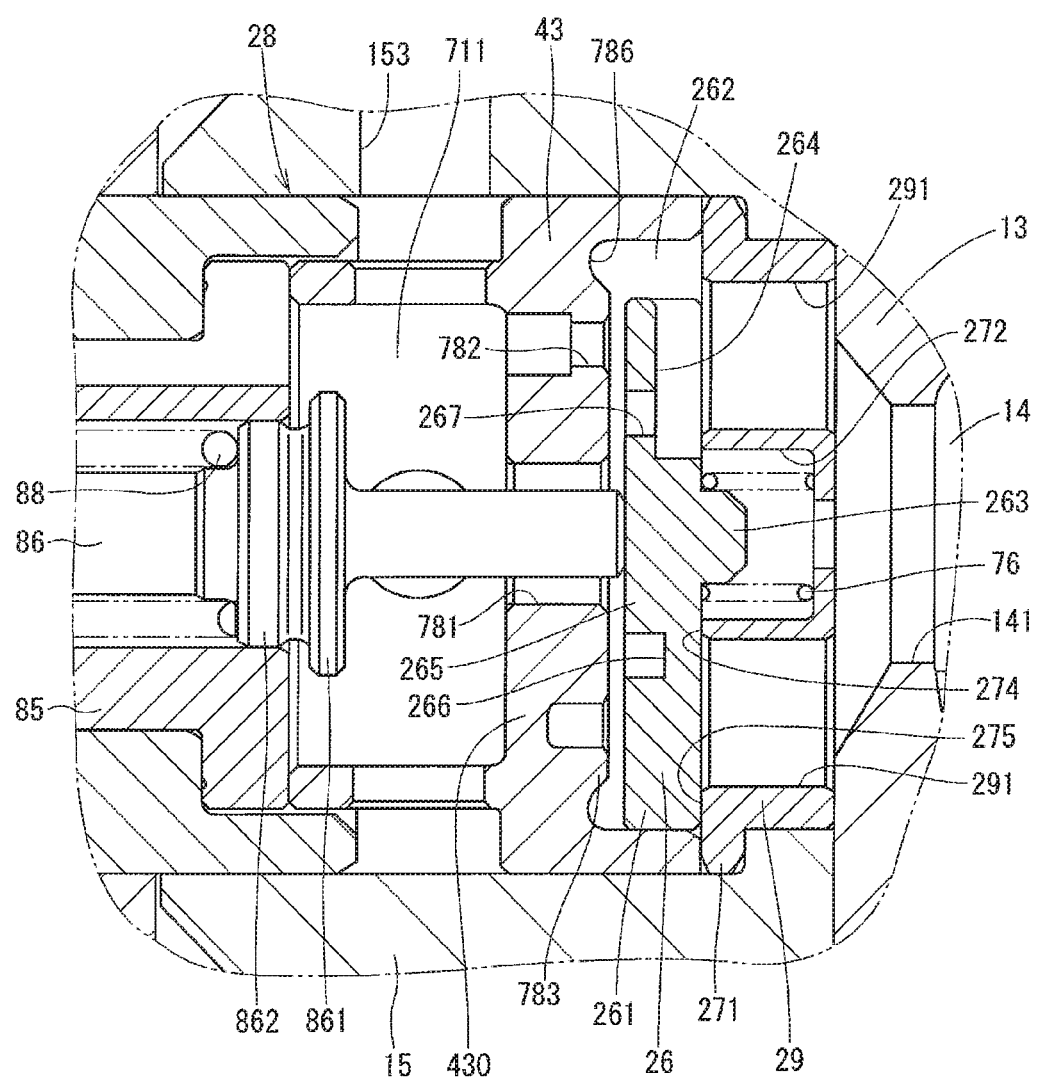
FIG. 28 is a sectional view showing a suction valve portion of a high pressure pump according to a modification of the fourteenth embodiment of the present invention.
Figures 29A, 29B:
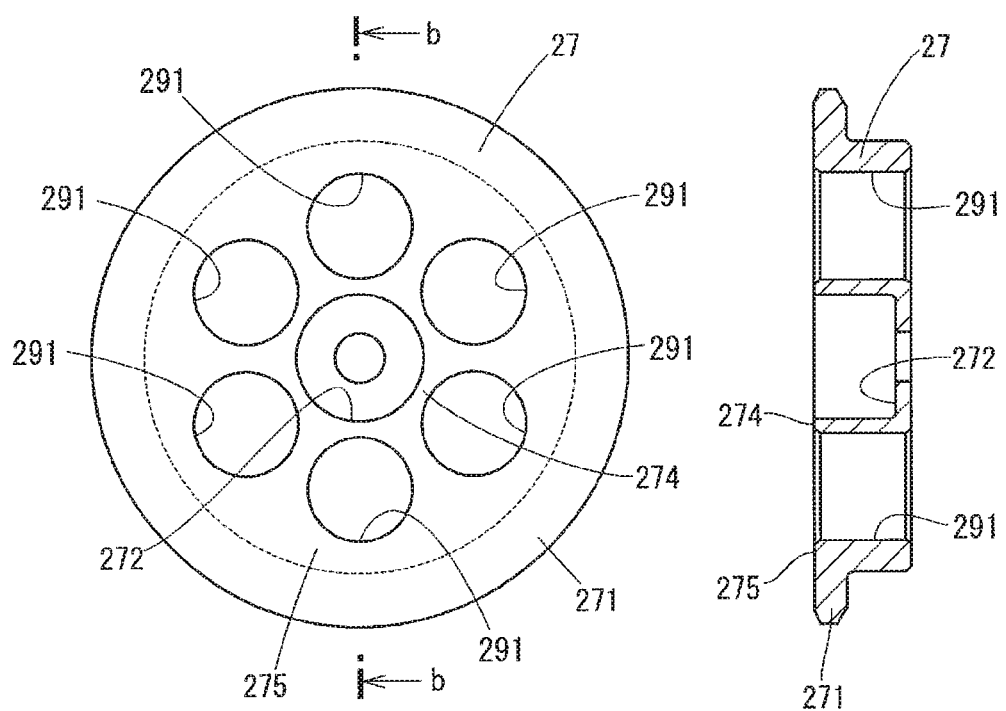
FIG. 29A is a plan view showing a valve member.
FIG. 29B is a sectional view taken along line "b-b" in FIG. 29A.

A suction valve portion of a modification of a fourteenth embodiment is explained in reference to FIGS. 28 and 29. As compared with the stopper 27 of the fourteenth embodiment, the stopper 29 of the suction valve portion 28 has second passages 291 instead of the annular groove 273 and the second passage 276. Six second passages 291 axially penetrate and are formed equidistantly in the circumferential direction. An inner diameter of the second passage 291 is larger than an inner diameter of the second passage 276 of the fourteenth embodiment. When the suction valve member 26 abuts the stopper 29, any one or more of the six second passages 291 communicate with each other.

In the modification of the fourteenth embodiment, when the suction valve member 26 abuts the stopper 29, the fuel can communicate through any one or more of the six second passages 291 with each other. Compared with the case where the annular groove 273 is formed as in the fourteenth embodiment, a mechanical strength of the stopper 29 is higher and production of the stopper 29 is easier because of a simpler shape of the stopper 29.

Fifteenth Embodiment

Figure 30:
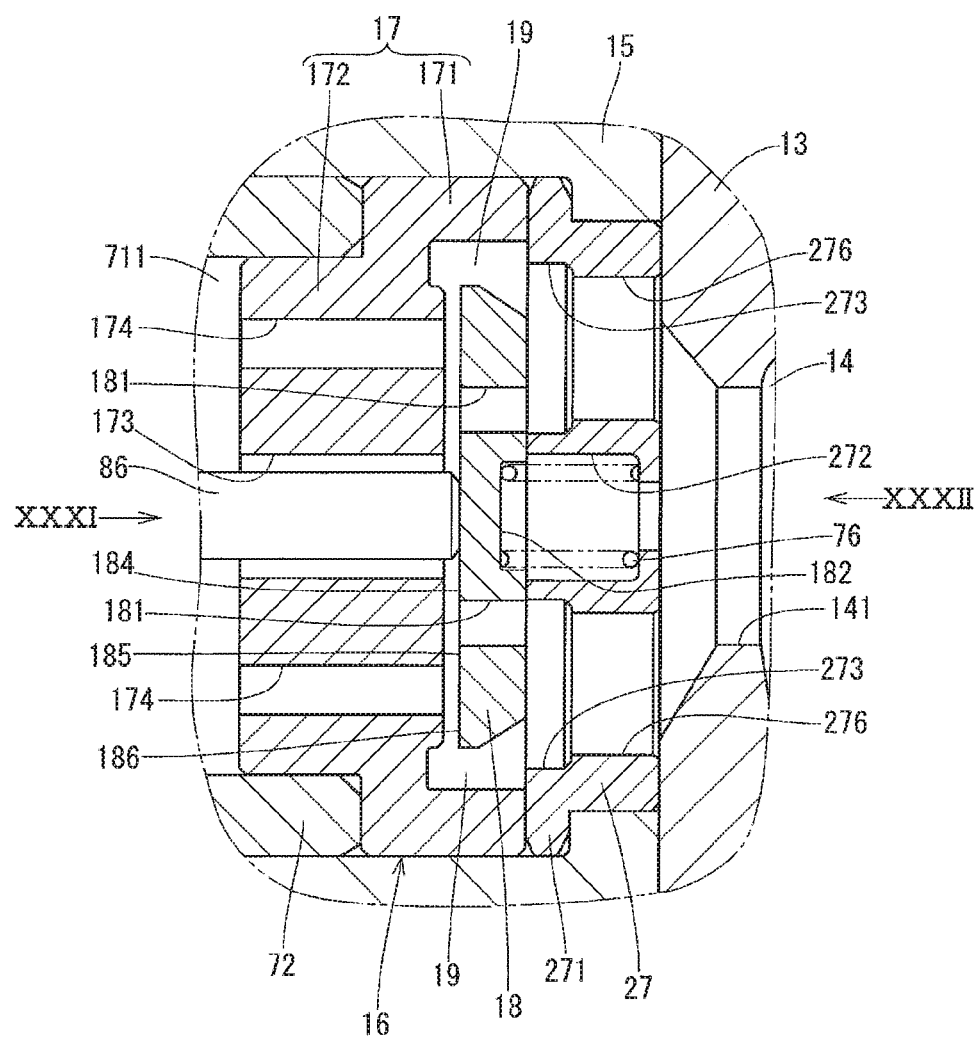
FIG. 30 is a sectional view of a suction valve portion of a high pressure pump according to a fifteenth embodiment of the present invention.
Figure 31:
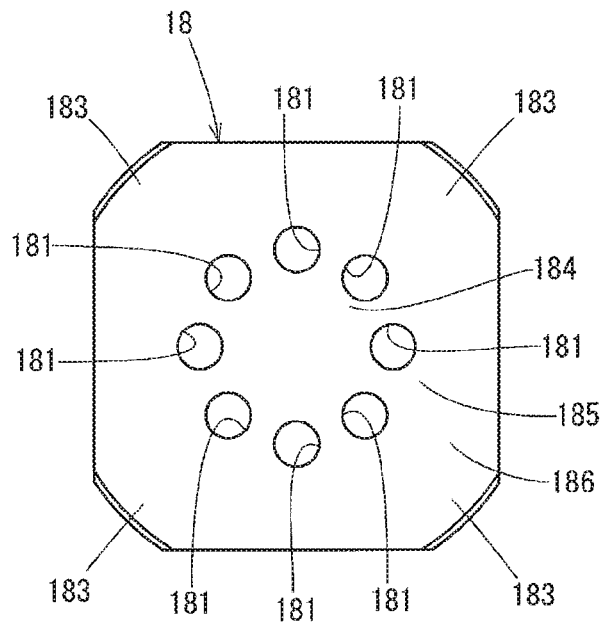
FIG. 31 is a view of the suction valve member viewed from an arrow "XXXI" in FIG. 30.
Figure 32:
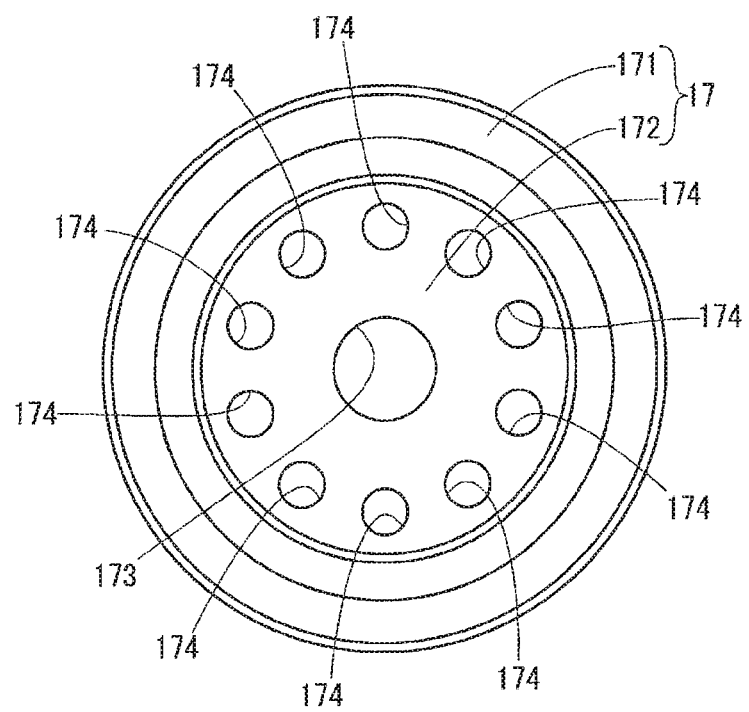
FIG. 32 is a view of the second suction valve body viewed from an arrow "XXXII" in FIG. 30.

A suction valve portion of a fifteenth embodiment of the present invention is explained in reference to FIGS. 30 to 32. A suction valve portion 16 has a second suction valve body 17 and a suction valve member 18. The second suction valve body 17 has a cylindrical outer edge 171 and a valve seat 172 filling the end of the outer edge 171. The second suction valve body 17 is pinched by the first suction valve body 72 and the stopper 27. The second suction valve body 17 corresponds to "valve body"

A valve seat 172 has an inner passage 173 penetrating axially at its radial center and outer passages 174 axially penetrating radially outside the inner passage 173. Ten outer passages 174 are formed equidistantly in the circumferential direction. The inner passage 173 and the outer passages 174 function as passages of fuel. The inner passage 173 functions also as an insertion hole of the needle 86.

The suction valve member 18 is plate shaped (and can include a chamfer on a side), located on the side of the pressurization chamber 14 relative to the valve seat 172, and can abut against and move away from the valve seat 172. The suction valve member 18 moves away from the valve seat 172 to communicate the suction chamber 711 and the pressurization chamber 14 with one another, and abuts the valve seat 172 to block the suction chamber 711 from the pressurization chamber 14.

The suction valve member 18 has first passages 181 axially penetrating between the inner passage 173 and outer passages 174 in the radial direction. Eight first passages 181 are formed equidistantly in the circumferential direction. The first passages 181 function as passages of fuel. One end of the first spring 76 is engaged with a fitting hole 182 in the axial center portion of the suction valve member 18.

The suction valve member 18 forms projection portions 183 projecting radially outward to narrow a radially outside passage 19 located radially outside the suction valve member 18. Four projection portions 183 are formed equidistantly in the circumferential direction. Radially outer walls of the projection portions 183 can slide on the inner wall of the second suction valve body 17. The projection portions 183 inhibit, from flowing toward the radially outside passage 19, the fuel that flows from the pressurization chamber 14 toward the suction valve member 18, and functions as guide portion to guide the fuel to the first passage 181.

The suction valve member 18 forms a first seal portion 184, a second seal portion 185, and a third seal portion 186 that abut against the valve seat 172 at the time of valve closing. The first seal portion 184 is located between the inner passage 173 and the first passages 181 in the radial direction. The first seal portion 184 seals between the inner passage 173 and the first passages 181 when the suction valve member 18 abuts the valve seat 172.

The second seal portion 185 is located between the first passages 181 and outer passages 174 in the radial direction. The second seal portion 185 seals between the first passages 181 and outer passages 174 when the suction valve member 18 abuts the valve seat 172. The third seal portion 186 is located between the outer passages 174 and the radially outside passage 19 in a radial direction. The third seal portion 186 seals between the outer passages 174 and the radially outside passage 19 when the suction valve member 18 abuts the valve seat 172.

In the fifteenth embodiment, a force by a pressure of the fuel that flows between the valve seat 172 and the suction valve member 18 is applied to the seal portions 184, 185, and 186 of the suction valve member 18 in the valve opening direction. The force in the valve opening direction is applied to the suction valve member 18 equally in the circumferential direction, and can counterbalance the force in the valve closing direction received by the suction valve member 18 due to the flow from the pressurization chamber 14 toward the suction valve member 18.

Therefore, while each of seal portions 184, 185, and 186 functions as a sealing portions to seal between each passage at the time of valve closing, it functions also as a self-closing inhibition portion to inhibit a self-closing of the suction valve member 18. Therefore, even when the biasing force of the spring that biases the suction valve member 18 in the valve opening direction is small, the self-closing of the suction valve member 18 can be inhibited. Therefore, the maximum output of the electromagnetic driving unit can be reduced, and the downsizing is realized.

In the fifteenth embodiment, eight first passages 181 are formed equidistantly in the circumferential direction. Therefore, the rigidity of the suction valve member 18 can be made uniform in the circumferential direction, and the clearance between the suction valve member 18 and valve seat 172 can be inhibited over the circumferential direction at the time of valve closing. Therefore, the fluid leakage at the time of valve closing can be inhibited, and the pump efficiency can be improved.

Modification of Fifteenth Embodiment

Figure 33:
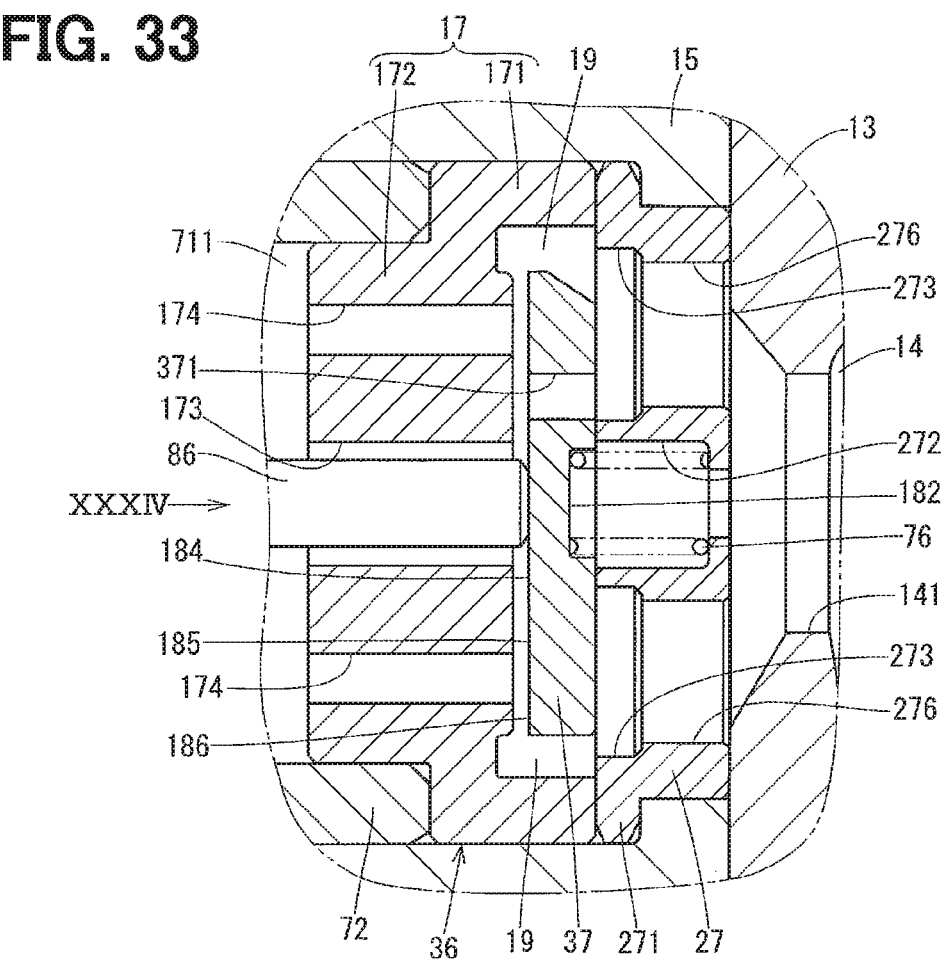
FIG. 33 is a sectional view of a suction valve portion of a high pressure pump according to a modification of a fifteenth embodiment of the present invention.
Figure 34:
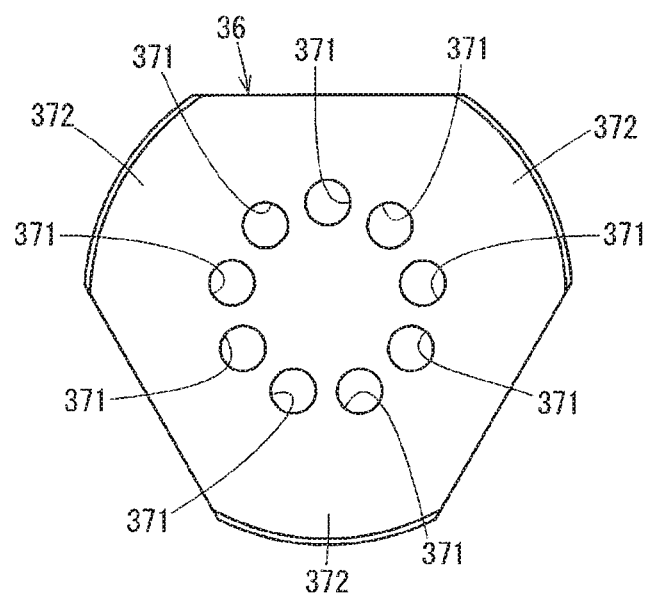
FIG. 34 is a view of the suction valve member viewed from an arrow "XXXIV" in FIG. 33.

A suction valve portion of a modification of a fifteenth embodiment is explained in reference to FIGS. 33 and 34. A suction valve member 37 of a suction valve portion 36 differs in first passages 371 and projection portions 372 from the suction valve member 18 of the fifteenth embodiment.

Nine first passages 371 are formed equidistantly in the circumferential direction. Three projection portions 372 are formed equidistantly in the circumferential direction. The modification of the fifteenth embodiment has the same advantageous effect as the fifteenth embodiment.

Other Embodiment

In another embodiment of the present invention, the number of the first passages of the suction valve member may be seven or less or ten or more.

The number of the outer passages of the valve seat may be nine or less or eleven or more. The first suction valve body and the second suction valve body may be integrally formed of the same member. The valve device may be applied, for example, to other devices of vehicles or industrial robots, machine tools and the like. Fluid flowing through the passages opened and closed by the valve device may not be limited to fuel but other liquids and gasses are acceptable as well.

The valve device may be a normally-close type valve. The needle and the valve member may be integrated. The driving unit may use not only the electromagnetic type but other driving type such as an electromotive type. The specifications of the components other than the suction valve portion of the high pressure pump are not limited to those of the above-mentioned embodiments.

The invention is not limited to the above-mentioned embodiments and can be embodied in various modes without departing from the subject matter thereof.

What is claimed is:

1. A high pressure pump, comprising:
a plunger;
a cylinder having a bottomed cylindrical shape, supporting the plunger reciprocally in an axial direction and having a pressurization chamber whose volumetric capacity changes when the plunger moves;
a suction chamber from which fuel is to be introduced into the pressurization chamber; and
a fuel suction portion having a valve device, the fuel suction portion configured to:
open a valve member when the plunger moves downward to supply fuel from the suction chamber to the pressurization chamber,
continue to open the valve member to return a part of the fuel, which is introduced into the pressurization chamber, to the suction chamber, and
close the valve member when the plunger starts moving upward or is during upward movement to pressure the fuel in the pressurization chamber, wherein
the valve device includes:
a valve body;
a valve seat having an inner passage located inward in a radial direction of the valve body and extending along a center axis of the valve body and an outer passage located outward in a radial direction of the valve body;
the valve member having a first passage that is provided to be able to abut against and move away from the valve seat and that is located between the inner passage and the outer passage in a radial direction; and
a driving unit that is able to inhibit movement of the valve member toward the valve seat, wherein:
the driving unit includes a needle that is a separate member from the valve member and is configured to abut against the valve member,
the valve member is provided with a first annular seal portion that seals between the inner passage and the first passage at a time of abutment on the valve seat, a second annular seal portion that seals between the first passage and the outer passage, and a third seal portion that seals between the outer passage and a radially outside passage located radially outside the valve member, and
the valve member has a chamfer on a side facing away from the third seal portion.

2. The high pressure pump according to claim 1, wherein:
a plurality of first passages, including at least the first passage, are provided in a circumferential direction.

3. The high pressure pump according to claim 1, wherein:
the valve member forms a plurality of projection portions projecting radially outward to narrow the radially outside passage; and
the projection portions function as a guide portion.

4. The high pressure pump according to claim 1, further comprising:
a stopper that is located oppositely to the valve seat relative to the valve member, forms an inner abutment portion to be able to abut against a radially inner portion of the valve member and an outer abutment portion to be able to abut against a radially outer portion of the valve member, and inhibits movement of the valve member oppositely to the valve seat.

5. The high pressure pump according to claim 4, wherein:
the stopper has a second passage penetrating radially between the inner abutment portion and the outer abutment portion.

6. The high pressure pump according to claim 1, wherein:
the valve member forms a first projection portion projecting oppositely to the valve seat relative to the first passage in a radially outer direction; and
the first projection portion functions as a guide portion.

7. The high pressure pump according to claim 6, wherein a portion of a radially inner wall of the first projection portion to the valve seat is proximate to the first passage in a direction toward the valve seat.

8. The high pressure pump according to claim 1, further comprising:
a cover member that is located oppositely to the valve seat relative to the valve member, has a third passage penetrating axially, and forms a second projection portion projecting radially outward of the first passage toward the valve member, wherein
the second projection portion functions as a guide portion.

9. The high pressure pump according to claim 8, wherein:
the second projection portion functions as an inhibition portion to inhibit movement of the valve member.

10. The high pressure pump according to claim 8, wherein a top of the second projection portion is located radially inward of the outer passage.

11. The high pressure pump according to claim 8, further comprising:
a spring that is located between the cover member and the valve member, provided to encircle the first passage and the third passage, and biases the valve member toward the valve seat, wherein
the spring functions as the guide portion.

12. The high pressure pump according to claim 1, further comprising:
a cover member that is located oppositely to the valve seat relative to the valve member and has a third passage penetrating axially; and
a spring that is located between the cover member and the valve member, provided to encircle the first passage and the third passage, and biases the valve member toward the valve seat, wherein:
the spring functions as a guide portion.

13. The high pressure pump according to claim 1, wherein one or both of a first wall of the valve member and a second wall of the valve seat that face one another have an annular first pressure equalization groove communicating with the first passage and encircling the inner passage, and
one or both of the first wall and the second wall have an annular second pressure equalization groove communicating with the outer passage and encircling the first pressure equalization groove and the first passage.

14. The high pressure pump according to claim 1, further comprising:
a guide member that permits axial movement of the valve member and inhibits radial movement of the valve member.

15. The high pressure pump according to claim 1, wherein:
the valve member is formed of a plurality of members laminated with each other.

16. The high pressure pump according to claim 1, wherein the valve seat is formed of a plurality of members laminated with each other.

17. The high pressure pump according to claim 1, wherein:
the needle is inside the inner passage and is coaxial with the inner passage.

18. The high pressure pump according to claim 17, wherein:
the inner passage overlaps with the center axis of the valve body.

19. The high pressure pump according to claim 1, wherein:
the outer passage is located between the chamfer of the valve member and the valve body in the radial direction.

20. The high pressure pump according to claim 1, wherein the valve device includes:
a stopper including a stopper portion extending toward the valve member and configured to abut against the valve member; and
a spring configured to bias the valve member, wherein the stopper has a second passage, and
the stopper portion and the spring are located radially inside of the first passage and the second passage.

21. A valve device, comprising:
a valve body;
a valve seat having an inner passage located inward in a radial direction of the valve body and extending along a center axis of the valve body and an outer passage located outward in a radial direction of the valve body;
a valve member having a first passage that is provided to be able to abut against and move away from the valve seat and that is located between the inner passage and the outer passage in a radial direction;
a stopper that is located oppositely to the valve seat relative to the valve member, the stopper forms an inner abutment portion configured to abut against a radially inner portion of the valve member and an outer abutment portion configured to abut against a radially outer portion of the valve member, and the stopper configured to inhibit movement of the valve member oppositely to the valve seat;
a spring that is placed radially inward of the inner abutment portion of the stopper to bias the valve member toward the valve seat; and
a driving unit configured to inhibit movement of the valve member toward the valve seat, wherein:
the valve member is provided with a first annular seal portion that seals between the inner passage and the first passage at a time of abutment on the valve seat, a second annular seal portion that seals between the first passage and the outer passage, and a third seal portion that seals between the outer passage and a radially outside passage located radially outside the valve member, and
the valve member has a chamfer on a side facing away from the third seal portion.

22. A valve device, comprising:
a valve body;
a valve seat having an inner passage located inward in a radial direction of the valve body and extending along a center axis of the valve body and an outer passage located outward in a radial direction of the valve body;
a valve member having a first passage that is provided to be able to abut against and move away from the valve seat and that is located between the inner passage and the outer passage in a radial direction; and
a driving unit that is able to inhibit movement of the valve member toward the valve seat, wherein:
the valve member is provided with a first annular seal portion that seals between the inner passage and the first passage at a time of abutment on the valve seat, a second annular seal portion that seals between the first passage and the outer passage, and a third seal portion that seals between the outer passage and a radially outside passage located radially outside the valve member,
the valve member has a chamfer on a side facing away from the third seal portion,
one or both of a first wall of the valve member and a second wall of the valve seat that face one another have an annular first pressure equalization groove communicating with the first passage and encircling the inner passage,
one or both of the first wall and the second wall have an annular second pressure equalization groove communicating with the outer passage and encircling the first pressure equalization groove and the first passage, and
the valve member has the first pressure equalization groove and the second pressure equalization groove.

\* \* \* \* \*